United States Patent
Markel et al.

(10) Patent No.: US 8,273,834 B2
(45) Date of Patent: *Sep. 25, 2012

(54) METHODS FOR DETERMINING TEMPERATURE VALUE INDICATIVE OF RESIN STICKINESS FROM DATA GENERATED BY POLYMERIZATION REACTION MONITORING

(75) Inventors: Eric J. Markel, Kingwood, TX (US); Robert O. Hagerty, La Porte, TX (US); Richard B. Pannell, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 525 days.

This patent is subject to a terminal disclaimer.

(21) Appl. No.: 12/310,723

(22) PCT Filed: Aug. 9, 2007

(86) PCT No.: PCT/US2007/017730
§ 371 (c)(1), (2), (4) Date: Feb. 19, 2010

(87) PCT Pub. No.: WO2008/030313
PCT Pub. Date: Mar. 13, 2008

(65) Prior Publication Data
US 2010/0144983 A1 Jun. 10, 2010

Related U.S. Application Data

(60) Provisional application No. 60/842,747, filed on Sep. 7, 2006.

(51) Int. Cl.
*C08F 2/00* (2006.01)
*C08F 10/14* (2006.01)
*C08F 110/14* (2006.01)
*C08F 210/14* (2006.01)

(52) U.S. Cl. ............ 526/59; 526/61; 526/60; 526/348.5
(58) Field of Classification Search ................ 526/59, 526/61, 60, 348.5
See application file for complete search history.

(56) References Cited

U.S. PATENT DOCUMENTS
3,056,771 A 10/1962 Lee et al. .................... 526/159
(Continued)

FOREIGN PATENT DOCUMENTS
EP 0089691 11/1989
(Continued)

OTHER PUBLICATIONS

Heiland, Kirstin and Kaminsky, Walter "Comparison of zirconocene and hafnocene catalysts for the polymerization of ethylene and 1-butene" *Makromol. Chem.*, vol. 193, pp. 601-610 (1992).

(Continued)

*Primary Examiner* — William Cheung

(57) ABSTRACT

In some embodiments, a method including the steps of monitoring a polymerization reaction which produces a polymer resin in a fluid bed reactor, where a dry melt reference temperature is characteristic of melting behavior of a dry version of the resin, and in response to data indicative of at least one monitored parameter of the reaction, determining in on-line fashion a reduced melt reference temperature that is at least substantially equal to the difference between the dry melt reference temperature and a temperature by which the dry melt reference temperature is depressed by the presence of condensable diluent gas with the resin in the reactor. Optionally, the method also includes the step of controlling the reaction in response to the reduced melt reference temperature or a stickiness parameter determined from the reduced melt reference temperature.

19 Claims, 4 Drawing Sheets

Fluidized Bed Reaction System

U.S. PATENT DOCUMENTS

| | | | |
|---|---|---|---|
| 3,082,198 A | 3/1963 | Klein | 526/91 |
| 3,470,143 A | 9/1969 | Schrage et al. | 526/206 |
| 3,919,185 A | 11/1975 | Takebe et al. | 526/74 |
| 4,012,574 A | 3/1977 | Jones et al. | 526/74 |
| 4,194,073 A | 3/1980 | McDaniel | 526/98 |
| 4,232,140 A | 11/1980 | Ort | 526/129 |
| 4,302,566 A | 11/1981 | Karol et al. | |
| 4,405,495 A | 9/1983 | Lee et al. | 502/104 |
| 4,543,399 A | 9/1985 | Jenkins, III et al. | |
| 4,588,790 A | 5/1986 | Jenkins, III et al. | |
| 4,593,010 A | 6/1986 | Malpass | 502/115 |
| 4,704,491 A | 11/1987 | Tsutsui et al. | 585/10 |
| 4,792,592 A | 12/1988 | Fulks et al. | 526/62 |
| 4,803,251 A | 2/1989 | Goode et al. | 526/59 |
| 4,855,370 A | 8/1989 | Chirillo et al. | 526/74 |
| 5,026,795 A | 6/1991 | Hogan | |
| 5,037,905 A | 8/1991 | Cummings et al. | 526/74 |
| 5,066,736 A | 11/1991 | Dumain et al. | 526/82 |
| 5,084,534 A | 1/1992 | Welborn, Jr. et al. | 526/160 |
| 5,086,134 A | 2/1992 | Antberg et al. | 526/126 |
| 5,194,526 A | 3/1993 | Hussein et al. | 526/74 |
| 5,218,071 A | 6/1993 | Tsutsui et al. | 526/348 |
| 5,258,475 A | 11/1993 | Kissin | 526/129 |
| 5,281,679 A | 1/1994 | Jejelowo | 526/114 |
| 5,290,745 A | 3/1994 | Jorgensen et al. | 502/109 |
| 5,324,800 A | 6/1994 | Welborn et al. | 526/160 |
| 5,342,907 A | 8/1994 | Cann et al. | 526/129 |
| 5,352,749 A | 10/1994 | DeChellis et al. | |
| 5,376,439 A | 12/1994 | Hodgson et al. | 428/220 |
| 5,387,660 A | 2/1995 | Doyle et al. | 526/69 |
| 5,391,657 A * | 2/1995 | Song et al. | 526/74 |
| 5,405,922 A | 4/1995 | DeChellis et al. | |
| 5,410,002 A | 4/1995 | Govoni et al. | 526/88 |
| 5,436,304 A | 7/1995 | Griffin et al. | |
| 5,453,471 A | 9/1995 | Bernier et al. | 526/68 |
| 5,462,999 A | 10/1995 | Griffin et al. | 526/68 |
| 5,510,433 A * | 4/1996 | Baker et al. | 526/74 |
| 5,523,435 A | 6/1996 | Lisowsky | 556/11 |
| 5,525,689 A | 6/1996 | Tsutsui et al. | 526/160 |
| 5,532,749 A | 7/1996 | Hong | 348/449 |
| 5,541,272 A | 7/1996 | Schmid et al. | 526/160 |
| 5,550,094 A | 8/1996 | Ali et al. | 502/115 |
| 5,616,661 A | 4/1997 | Eisinger et al. | 526/88 |
| 5,624,878 A | 4/1997 | Devore et al. | 502/152 |
| 5,674,795 A | 10/1997 | Wasserman et al. | 502/9 |
| 5,767,208 A | 6/1998 | Turner et al. | 526/160 |
| 5,990,251 A | 11/1999 | Gelus | |
| 6,124,229 A | 9/2000 | Becker et al. | 502/102 |
| 6,147,172 A | 11/2000 | Brown et al. | 526/126 |
| 6,234,950 B1 | 5/2001 | Von Haken et al. | 502/155 |
| 6,235,671 B1 | 5/2001 | McKay et al. | 502/110 |
| 6,235,672 B1 | 5/2001 | McKay et al. | 502/155 |
| 6,239,061 B1 | 5/2001 | Wang et al. | 502/162 |
| 6,239,238 B1 | 5/2001 | Brown et al. | 526/161 |
| 6,248,845 B1 | 6/2001 | Loveday et al. | 526/113 |
| 6,281,306 B1 | 8/2001 | Oskam et al. | 526/161 |
| 6,313,236 B1 | 11/2001 | Ford et al. | 526/74 |
| 6,355,744 B1 | 3/2002 | von Haken et al. | 526/127 |
| 6,417,298 B1 | 7/2002 | Ford et al. | 526/89 |
| 6,455,638 B2 | 9/2002 | Laughner et al. | 525/191 |
| 6,486,273 B1 | 11/2002 | McKay et al. | 526/113 |
| 6,534,613 B2 | 3/2003 | Ford et al. | 526/352 |
| 6,579,998 B2 | 6/2003 | Sita et al. | 556/53 |
| 6,649,558 B2 | 11/2003 | Brown et al. | 502/155 |
| 6,656,866 B2 | 12/2003 | Wenzel et al. | 502/117 |
| 6,656,868 B2 | 12/2003 | Oskam et al. | 502/155 |
| 6,660,815 B2 | 12/2003 | Agapiou et al. | 526/130 |
| 7,122,607 B2 | 10/2006 | Hagerty et al. | 526/73 |
| 7,300,987 B2 | 11/2007 | Hagerty et al. | 526/73 |
| 7,459,510 B2 | 12/2008 | Lin et al. | 526/135 |
| 7,507,780 B2 | 3/2009 | Hagerty et al. | 526/73 |
| 2001/0044505 A1 | 11/2001 | Ford et al. | 526/62 |
| 2002/0198335 A1 | 12/2002 | Bernier et al. | |
| 2003/0100688 A1 | 5/2003 | Farrer et al. | 526/110 |
| 2003/0121330 A1* | 7/2003 | Muhle et al. | 73/600 |
| 2003/0171512 A1 | 9/2003 | Mawson et al. | 526/129 |
| 2004/0063871 A1 | 4/2004 | Parrish et al. | |
| 2005/0267269 A1 | 12/2005 | Hagerty et al. | |
| 2007/0043174 A1 | 2/2007 | Parrish et al. | 526/59 |
| 2007/0060721 A1 | 3/2007 | Muhle et al. | |
| 2007/0073010 A1 | 3/2007 | Pannell et al. | |
| 2008/0065360 A1 | 3/2008 | Pannell et al. | 703/2 |
| 2009/0234081 A1 | 9/2009 | Thomas, Jr. et al. | 526/60 |

FOREIGN PATENT DOCUMENTS

| | | |
|---|---|---|
| EP | 0549252 | 6/1993 |
| EP | 0366823 | 9/1993 |
| EP | 0443686 | 12/1994 |
| EP | 0481480 | 1/1995 |
| EP | 0413326 | 3/1995 |
| EP | 0453116 | 4/1995 |
| EP | 0284707 | 8/1995 |
| EP | 0754708 | 1/1997 |
| EP | 0596553 | 5/1997 |
| EP | 0612768 | 11/1997 |
| EP | 0668296 | 5/1998 |
| EP | 0495099 | 6/1998 |
| EP | 0669346 | 6/1998 |
| EP | 0722955 | 1/1999 |
| EP | 0781789 | 5/2000 |
| EP | 0794200 | 7/2000 |
| EP | 0773239 | 12/2001 |
| EP | 1323746 | 2/2009 |
| JP | 09-176400 | 7/1997 |
| WO | WO 94/03509 | 2/1994 |
| WO | WO 97/14721 | 4/1997 |
| WO | WO 97/22635 | 6/1997 |
| WO | WO 98/02470 | 1/1998 |
| WO | 99/61486 | 12/1999 |
| WO | WO 02/46250 | 6/2002 |
| WO | WO 03/010211 | 2/2003 |
| WO | 03/051929 | 6/2003 |
| WO | WO 2004/058825 | 7/2004 |
| WO | WO 2004/058827 | 7/2004 |
| WO | WO 2004/058828 | 7/2004 |
| WO | 2005/049663 | 6/2005 |
| WO | 2005/113610 | 12/2005 |
| WO | 2005/113615 | 12/2005 |
| WO | 2006/009980 | 1/2006 |
| WO | WO 2008/030313 | 3/2008 |

OTHER PUBLICATIONS

Tian, Jun and Huang, Baotong, "Ethylene polymerization with catalyst systems based on metallocenes with varying steric hindrance and methylaluminoxane" *Macromol. Rapid Commun.*, 15, 923-928 (1994).

Usami, Takao et al., "Generation Mechanism of Short-Chain Branching Distribution in Linear Low-Density Polyethylenes" *Macromolecules*, vol. 19, pp. 2722-2726 (1986).

"Agglomeration Detection by Acoustic Emission," *Process Analysis & Automation Ltd.* (2000).

"Acoustic Emission Technology," *Process Analysis and Automation Ltd.* (2000).

Ardell et al., "Model Prediction for Reactor Control," *Chemical Engineering Progress, American Institute of Chemical Engineers*, vol. 79, No. 6, pp. 77-83 (1983).

\* cited by examiner

Figure 1 – Fluidized Bed Reaction System
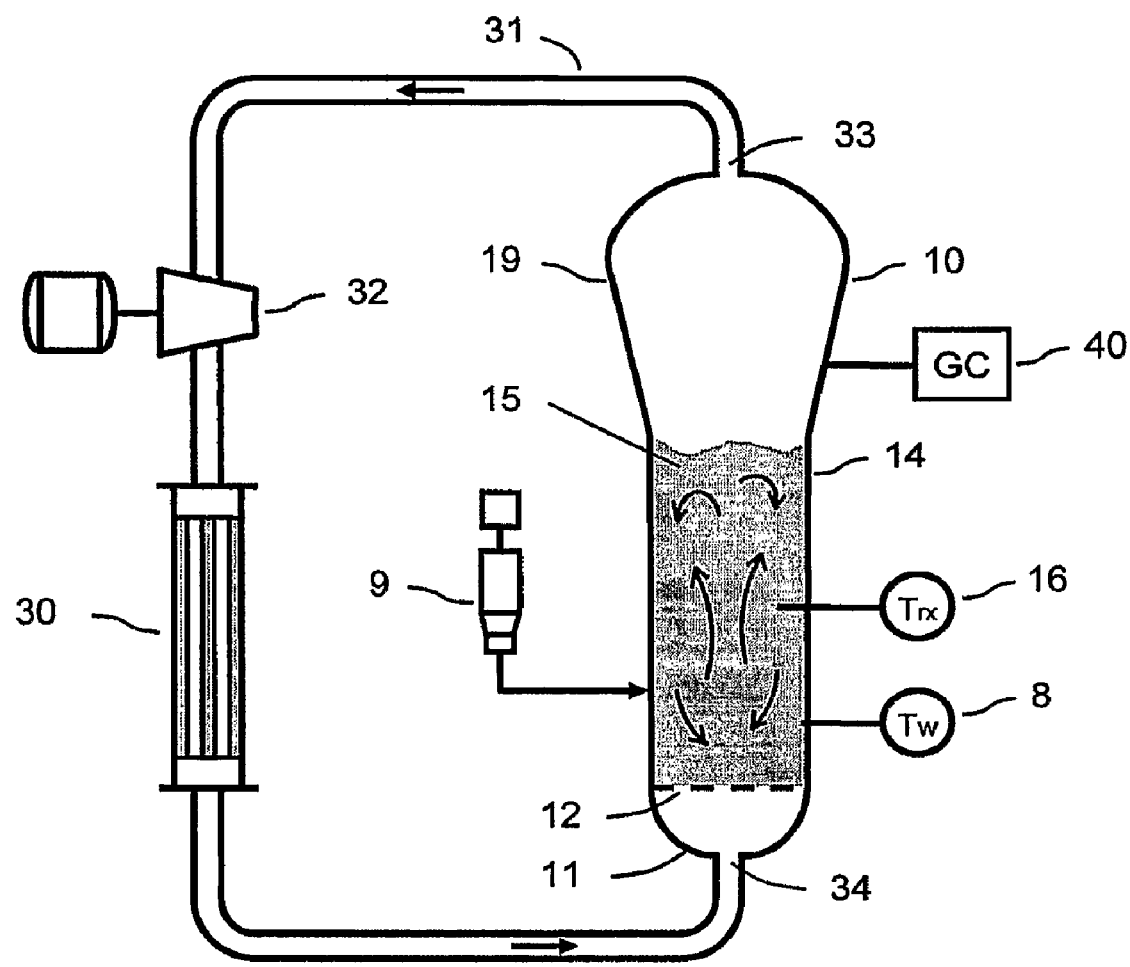

Figure 2 – Process For Monitoring And Control of Reactor Stickiness
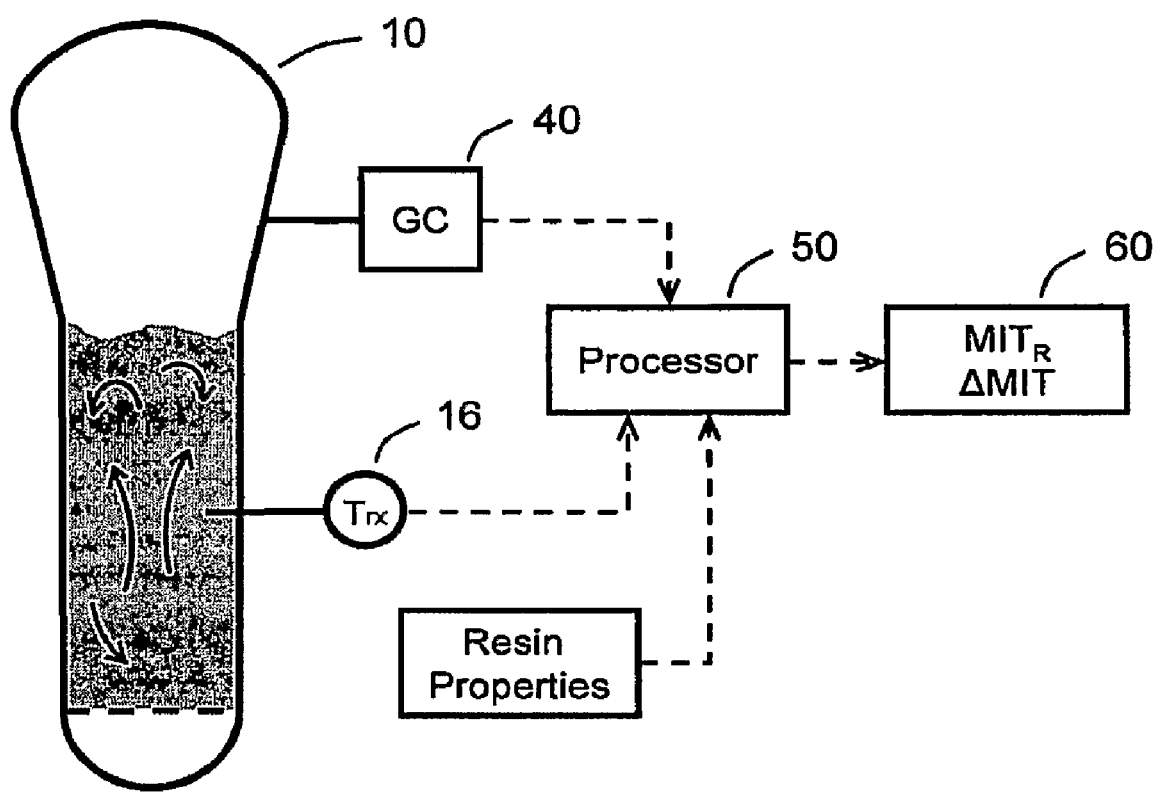

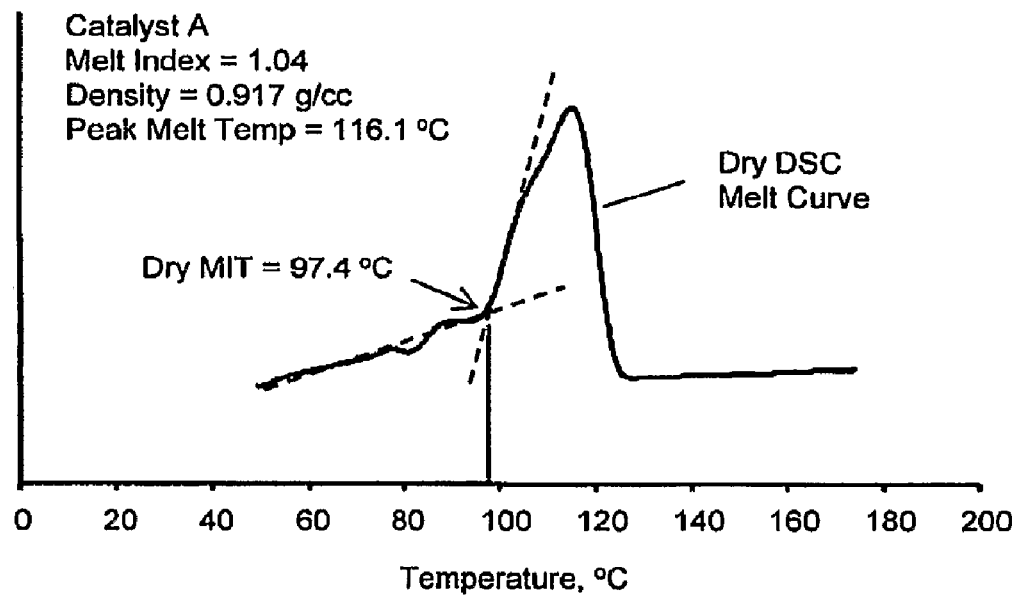
Figure 3 – First Melt DSC Curve
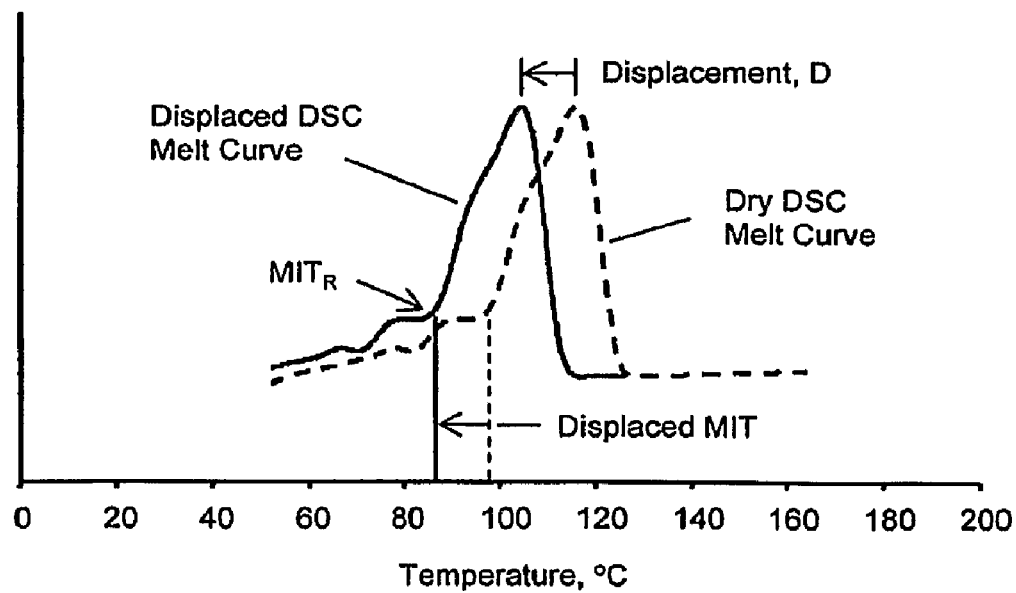
Figure 4 – Displaced MIT ($MIT_R$)

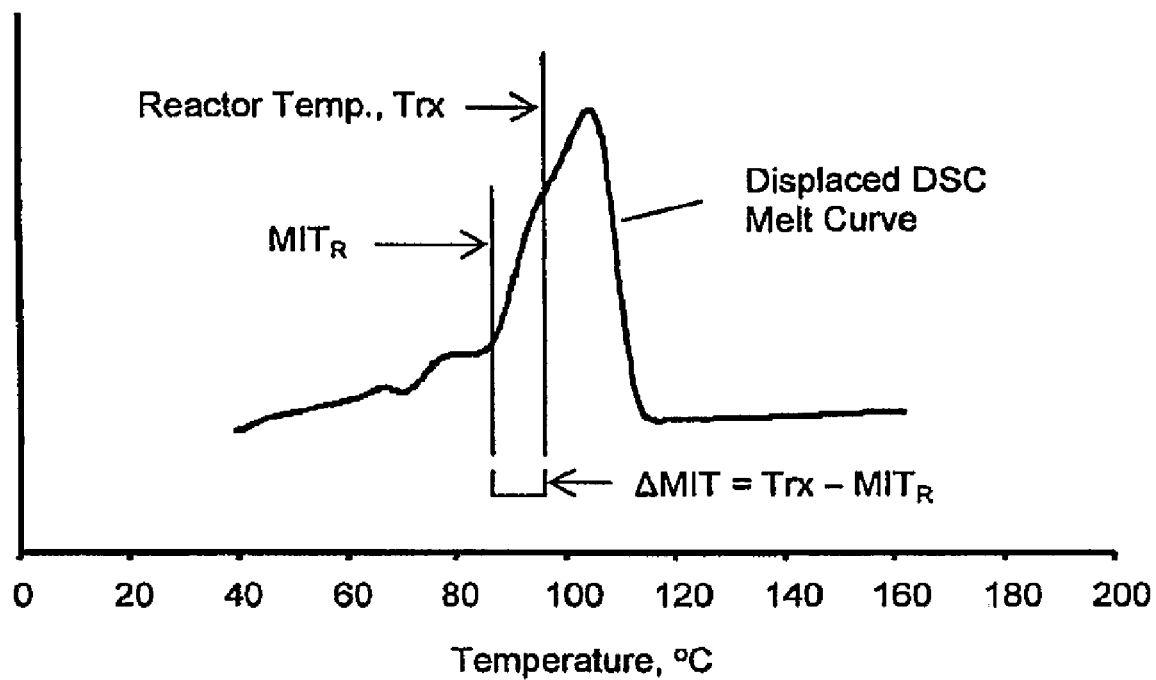

METHODS FOR DETERMINING TEMPERATURE VALUE INDICATIVE OF RESIN STICKINESS FROM DATA GENERATED BY POLYMERIZATION REACTION MONITORING

CROSS-REFERENCE TO RELATED APPLICATIONS

This application is a National Stage entry under 35 U.S.C. §371 of International Application No. PCT/US2007/17730, filed Aug. 9, 2007, and claims the benefit of Ser. No. 60/842,747, filed Sep. 7, 2006, the disclosure of which is incorporated by reference.

FIELD OF THE INVENTION

The invention pertains to methods for monitoring a polymerization reaction (e.g., an olefin polymerization reaction conducted in a gas phase reactor) which produces a polymer resin in a fluid bed reactor, generating (in on-line fashion) data indicative of a reference temperature (indicative of a degree of stickiness of the resin in the reactor), and optionally also controlling the reaction in response to the reference temperature (or a temperature value related thereto). Embodiments of the invention relate to monitoring a gas-phase polymerization reaction which produces a polymer resin in a fluid bed reactor to determine a reference temperature indicative of a degree of stickiness of the resin in the reactor, and optionally also controlling the reaction using the reference temperature or a temperature value related thereto.

BACKGROUND OF THE INVENTION

The expression "on-line generation" of data during a reaction is used herein to denote generation of the data sufficiently rapidly that the data is available essentially instantaneously for use during the reaction. The expression "generation of data in on-line fashion" during a reaction is used synonymously with the expression on-line generation of data during a reaction. Generation of data from at least one laboratory test (on at least one substance employed or generated in the reaction) is not considered "on-line generation" of data during the reaction, if the laboratory test consumes so much time that parameters of the reaction may change significantly during the test. It is contemplated that on-line generation of data can include the use of a previously generated database that may have been generated in any of a variety of ways including time-consuming laboratory tests.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

Throughout this disclosure, the expression "diluent" (or "condensable diluent" or "condensable diluent gas") denotes condensable gas (or a mixture of condensable gases) present in a polymerization reactor with polymer resin being produced. The diluent is condensable at the temperatures encountered in the process heat exchanger. Examples of diluents include induced condensing agents (ICAs), comonomers, isomers of comonomers, and combinations thereof.

The expression "dry polymer resin" (or "dry version" of polymer resin) is used herein to denote polymer resin that does not contain substantial amounts of dissolved gas. An example of dry polymer resin is polymer that had been previously produced in a polymerization reactor and then purged to eliminate all (or substantially all) unreacted comonomers and ICAs that had been dissolved in the polymer at the time of production. As will be discussed herein, a dry version of polymer resin has significantly different melting behavior than would the same polymer resin if it were in the presence of a significant amount of condensable diluent gas and comonomer.

The expression polyethylene denotes a polymer of ethylene and optionally one or more $C_3$-$C_{10}$ α-olefins while the expression polyolefin denotes a polymer of one or more $C_2$-$C_{10}$ α-olefins.

Throughout this disclosure, the abbreviation "MI" (or $I_2$) denotes melt index, according to ASTM-D-1238-E238-E.

One commonly used method for producing polymers is gas phase polymerization. A conventional gas phase fluidized bed reactor, during operation to produce polyolefins by polymerization, contains a fluidized dense-phase bed including a mixture of reaction gas, polymer (resin) particles, catalyst, and (optionally) catalyst modifiers. Typically, any of several process control variables can be controlled to cause the reaction product to have desired characteristics.

Generally in a gas-phase fluidized bed process for producing polymers from monomers, a gaseous stream containing one or more monomers is continuously passed through a fluidized bed under reactive conditions in the presence of a catalyst. This gaseous stream is withdrawn from the fluidized bed and recycled back into the reactor. Simultaneously, polymer product is withdrawn from the reactor and new monomer is added to replace the polymerized monomer. The recycled gas stream is heated in the reactor by the heat of polymerization. This heat is removed in another part of the cycle by a cooling system external to the reactor.

It is important to remove heat generated by the reaction in order to maintain the temperature of the resin and gaseous stream inside the reactor at a temperature below the polymer melting point and/or catalyst deactivation temperature. Further, heat removal is important to prevent excessive stickiness of polymer particles that if left unchecked, may result in loss of fluidization or agglomeration of the sticky particles which may lead to formation of chunks or sheets of polymer that cannot be removed as product. Further, such chunks or sheets may fall onto the distributor plate causing impaired fluidization, and in many cases forcing a reactor shutdown. Prevention of such stickiness has been accomplished by controlling the temperature of the fluid bed to a temperature below the fusion or sintering temperature of the polymer particles. Above this fusion or sintering temperature, empirical evidence suggests that such fusion or sintering leads to agglomeration or stickiness, which in turn, if left unchecked, may lead to the above conditions.

It is understood that the amount of polymer produced in a fluidized bed polymerization process is directly related to the amount of heat that can be withdrawn from the fluidized bed reaction zone. Since the exothermic heat generated by the reaction is directly proportional to the rate of polymer production. In steady state operation of the reaction process, the rate of heat removal from the fluidized bed must equal the rate of rate of heat generation, such that the bed temperature remains constant. Conventionally, heat has been removed from the fluidized bed by cooling the gas recycle stream in a heat exchanger external to the reactor.

A requirement of a fluidized bed process is that the velocity of the gaseous recycle stream be sufficient to maintain the reaction zone in a fluidized state. In a conventional fluidized bed polymerization process, the amount of fluid circulated to remove the heat of polymerization is greater than the amount of fluid required for support of the fluidized bed and for adequate mixing of the solids in the fluidized bed. The excess velocity provides additional gas flow to (and through) the fluid bed for additional cooling capacity and more intensive mixing of the reactor bed. However, to prevent excessive entrainment of solids in a gaseous stream withdrawn from the fluidized bed, the velocity of the gaseous stream must be regulated.

For a time, it was thought that the temperature of the gaseous stream external to the reactor, otherwise known as the recycle stream temperature, could not be decreased below the dew point of the recycle stream without causing problems of polymer agglomeration or plugging of the reactor system. The dew point of the recycle stream is that temperature at which liquid condensate first begins to form in the gaseous recycle stream. The dew point can be calculated knowing the gas composition and is thermodynamically defined using an equation of state.

Contrary to this belief, as suggested by Jenkins, et al. in U.S. Pat. No. 4,543,399 and related U.S. Pat. No. 4,588,790, a recycle stream can be cooled to a temperature below the dew point in a fluidized bed polymerization process resulting in condensing a portion of the recycle gas stream. The resulting stream containing entrained liquid is then returned to the reactor without causing the aforementioned agglomeration and/or plugging phenomena (which had been expected prior to Jenkins). The process of purposefully condensing a portion of the recycle stream is known in the industry as "condensed mode" operation in a gas phase polymerization process.

The above-cited U.S. patents to Jenkins et al. suggest that when a recycle stream temperature is lowered to a point below its dew point in "condensed mode" operation, an increase in polymer production is possible, as compared to production in a non-condensing mode because of increased cooling capacity. Consequently, a substantial increase in space-time yield, the amount of polymer production in a given reactor volume, can be achieved by condensed mode operation with little or no change in product properties.

Cooling of the recycle stream to a temperature below the gas dew point temperature produces a two-phase gas/liquid mixture with solids contained in both of these phases. The liquid phase of this two-phase gas/liquid mixture in "condensed mode" operation remains entrained or suspended in the gas phase of the mixture. Vaporization of the liquid occurs only when heat is added or pressure is reduced. In the process described by Jenkins, et al., vaporization occurs when the two-phase mixture enters the fluidized bed, with the (warmer) resin providing the required heat of vaporization. The vaporization thus provides an additional means of extracting heat of reaction from the fluidized bed. The heat removal capacity is further enhanced in condensed mode operation by the lower gas temperatures of the gas stream entering the fluidized bed. Both of these factors increase the overall heat removal capability of the system and thereby enable higher space-time yields (higher reactor production rates per unit volume of the fluidized bed).

Jenkins, et al. illustrate the difficulty and complexity of such reactor control in general, and of trying to extend the stable operating zone to optimize the space time yield in a gas phase reactor, especially when operating in condensed mode.

The cooling capacity of recycle gas can be increased further while at a given reaction temperature and a given temperature of the cooling heat transfer medium. One option described is to add non-polymerizing, non-reactive materials to the reactor, which are condensable at the temperatures encountered in the process heat exchanger. Such non-reactive, condensable materials are collectively known as induced condensing agents (ICAs). Increasing concentrations of ICA in the reactor causes corresponding increases in the dew point temperature of the reactor gas, which promotes higher levels of condensing for higher (heat transfer limited) production rates from the reactor. Suitable ICA materials are selected based on their specific heat and boiling point properties. In particular, an ICA compound is selected such that a relatively high portion of the material is condensed at the cooling water temperatures available in polymer production plants, which are typically 20-40° C. ICA materials include hexane, isohexane, pentane, isopentane, butane, isobutane and other hydrocarbon compounds that are similarly non-reactive in the polymerization process.

U.S. Pat. No. 5,352,749, to DeChellis et al, teaches that there are limits to the concentrations of condensable gases, whether ICA materials, comonomers or combinations thereof, that can be tolerated in the reaction system. Above certain limiting concentrations, the condensable gases can cause a sudden loss of fluidization in the reactor, and a consequent loss in ability to control the temperature in the fluid bed. The above-cited U.S. Pat. Nos. 5,352,749, and 5,405,922 and 5,436,304, disclose upper limits of ICA in the reactor are discussed, depending on the type of polymer being produced. U.S. Pat. No. 5,352,749 discloses that a limiting concentration of ICA (isopentane) exists, beyond which the reactor contents suddenly lose fluidization. The authors characterized this limit by tracking the ratio of fluidized bulk density to settled bulk density. As the concentration of isopentane was increased, they found that the bulk density ratio steadily decreased. When the concentration of isopentane was sufficiently high, corresponding to a bulk density ratio of 0.59, they found that fluidization in the reactor was lost. They therefore determined that this ratio (0.59) was a point of no return, below which the reactor will cease functioning due to loss of fluidization.

Although not appreciated by the authors of U.S. Pat. No. 5,352,749, the sudden loss in fluidization at relatively high ICA concentrations was due to the formation of sticky polymer. As described in PCT Application Publication Number WO 2005/113615(A2), attempts to operate polymerization reactors with excessive ICA concentrations cause polymer particles suspended in the fluid bed to become cohesive or "sticky," and in some cases cause the fluid bed to solidify in the form of a large chunk. This stickiness problem is characterized by undesirable changes in fluidization and mixing in the fluid bed, which if left unchecked, may develop into a reactor discontinuity event, such as sheeting in the straight sided reaction section, sheeting in the dome of such a reactor or chunking, any of which can lead to reactor shut-downs, which in large scale reactors are expensive. These solid masses (sheets or chunks) of polymer eventually become dislodged from the walls and fall into the reaction section and settle on the distributor plate, where they interfere with fluidization, block the product discharge port, and usually force a reactor shut-down for cleaning. The term "discontinuity event" is used to describe a disruption in the continuous operation of a polymerization reactor caused by sheeting, chunking or distributor plate fouling. The terms "sheeting and/or chunking" while used synonymously herein, may describe different manifestations of problems caused by excessive polymer stickiness in the fluid bed. In either manifestation (sheeting or chucking) the excessive polymer stickiness can lead directly to a reactor discontinuity event with the associated loss production.

Two articles by Process Analysis & Automation Limited (PAA), entitled "Agglomeration Detection by Acoustic Emission," PAA Application note: 2002/111 (© 2000) and "Acoustic Emission Technology—a New Sensing Technique for Optimising Polyolefin Production" (© 2000), suggest process control in fluidized bed production of polyolefins utilizing acoustic emission sensors located at various positions on the reactor and recycle piping. These publications purport to solve the problem of detecting large polymer agglomerates in a reactor, such as chunks or sheets, rather than detecting stickiness of the resin particles, and provide only one specific example, showing the detection of a chunk of approximately 1.5 meters in diameter within a commercial fluid bed reactor. There is no mention of the detection of polymer stickiness or cohesiveness. In effect, the PAA documents describe the detection of agglomerates after they have been formed in the reactor, rather than detection of resin stickiness that, if left unchecked, could lead to the formation of the agglomerates.

PCT Application Publication Number WO 03/051929 describes the use of mathematical chaos theory to detect the onset and presence of sheeting in a fluid bed reactor. Signals from a range of instruments, including acoustic emission sensors, differential pressure sensors, static sensors, and wall temperature sensors are filtered by certain specified methods to construct a "time-series" of data, which is then processed by methods of non-linear dynamics herein referred to as chaos theory and compared to data from a control reactor running without sheeting. The onset of sheeting is indicated by an increase in mean "cycle time" (relative to a baseline, control reactor), usually with a concurrent decrease in the "mean deviation" of the time-series. Alternatively, the onset of sheeting is indicated by a decrease in the mathematical "entropy" of the time-series data, as compared to a similar reactor running without sheeting. (The terms "time-series", "cycle time", "mean deviation", and "entropy" here refer to calculated parameters defined by chaos theory.) This reference does not disclose processing of sensor readings (without recourse to the complexities involved with chaos theory) to generate data indicative of conditions at which the resin in a reactor is predicted to become sticky, or any method allowing safe operation of a polymerization reactor near its limit of ultimate cooling capacity for maximum production rates.

Adding to the complexity of control of stickiness while using ICAs, different polymer products vary widely in their ability to tolerate ICA materials, some having a relatively high tolerance (expressed in partial pressure of the ICA in the reactor), e.g. 50 psia, while other polymers may tolerate as little as 5 psia. In these latter polymers, the heat transfer limited production rates under similar conditions are substantially lower. Polymers which possess a more uniform comonomer composition distribution are known to have a higher tolerance to the partial pressure of the ICA in the reactor. Typical metallocene catalysts are a good example of catalysts that may produce polymers having a more uniform comonomer composition. However, at some point even these metallocene produced polymers reach a limiting ICA concentration that induces stickiness. The limiting ICA concentration depends on several factors in addition to the polymer type, including reactor temperature, comonomer type and concentration. Further, with the effect of temperature, ICA level and comonomer levels all affecting on the onset of stickiness, determining the point at which sticking begins to occur has heretofore been difficult.

Even within the constraints of conventional, safe operation, control of such reactors is complex adding further to the difficulty and uncertainty of experimentation if one wishes to find new and improved operating conditions that might result in higher production rates. Large-scale gas phase plants are expensive and highly productive. Risks associated with experimentation in such plants are high because downtime is costly. Therefore it is difficult to explore design and operating boundaries experimentally in view of the costs and risks.

It would be desirable to provide a method of determining a stable operating condition for gas fluidized bed polymerization, especially if operating in condensed mode, to facilitate optimum design of the plant and the determination of desirable process conditions for optimum or maximum production rates in a given plant design.

It would also be desirable to have a mechanism in commercial gas-phase reactors to detect the onset of stickiness that is a better or earlier indicator of the onset of stickiness than are conventional techniques (e.g., monitoring the fluidized bulk density as described in U.S. Pat. No. 5,352,749). Such a mechanism would allow the operators to determine when conditions of limiting stickiness are being approached, and enable them to take corrective action before discontinuity events (such as sheeting and chunking) occur, while keeping the reactors at or near conditions of maximum ICA concentration, permitting higher production rates with substantially less risk.

PCT Application Publication Number WO 2005/113615 and corresponding U.S. Patent Application Publication No. 2005/0267269, published Dec. 1, 2005, describe determination in a laboratory of a critical temperature below which resin in a polymerization reactor cannot become sticky, and use of this predetermined critical temperature to control the reactor. These references define "dry sticking temperature" of a polymer to be produced in a fluidized bed reactor as the temperature at which agglomeration or fouling on any surface of the reactor vessel begins to occur with the reactor operating at normal pressure and gas velocity but in the presence of substantially pure nitrogen rather than the normal gas components, or the temperature at which there is at least a 50% drop in bandwidth of the bed DP reading, whichever is less (where "bed Dreading" denotes measured pressure difference between the bottom and top of the fluid bed). They define "melting point depression" as the temperature by which the melting point of the polymer in the reactor will be depressed by the presence of condensables (ICA and comonomer) to be used in the process. The references also describe a method including the steps of determining the dry sticking temperature of a polymer to be produced; determining the melting point depression for the reaction as a result of laboratory measurements (i.e., by tests performed in a laboratory on a sample of the polymer to be produced, immersed in a liquid or liquid mixture) rather than reaction parameter measurements generated by monitoring the reaction; and then operating the gas phase reactor process with a bed temperature below a "critical temperature" defined as the dry sticking temperature minus the melting point depression. The references teach that performing the reaction with the bed temperature below the critical temperature can eliminate stickiness in the resin due to high concentrations of condensables.

U.S. patent application Ser. No. 11/227,710, entitled "Method for Operating a Gas-Phase Reactor at or Near Maximum Production Rates While Controlling Polymer Stickiness," filed by Michael E. Muhle and Robert O. Hagerty on Sep. 14, 2005, discloses monitoring (during operation of a polymerization reactor) of resin stickiness by generating a time series of readings of acoustic emissions of the contents of the reactor using acoustic emission sensors. Acoustic emission measurements are generated during steady state operation of a reactor (producing the relevant polymer). Additional acoustic emission measurements (generated during operation of the reactor) are then processed to determine whether they deviate from acoustic emissions indicative of steady state reactor operation. Such deviation is treated as an indication of onset of excessive stickiness of polymer particles in the reactor. Corrective action can be taken (e.g., ICA and/or monomer levels and/or reactor temperature can be adjusted) when the acoustic emission measurements are determined to deviate from those of a steady state reactor. However, this application does not teach the generation of a reference temperature above which resin in a reactor is predicted to become sticky. Other background references include WO 2005/049663, WO 2005/113610, WO 2006/009980, U.S. Patent Application Nos. 2004/063871 and 2007/073010, and Ardell, G. G. et al., "Model Prediction for Reactor Control," *Chemical Engineering Progress*, American Institute of Chemical Engineers, U.S. vol. 79, no. 6, 1 Jun. 1983, pgs. 77-83.

SUMMARY OF THE INVENTION

In a class of embodiments, the invention is a method including the steps of:

(a) monitoring a polymerization reaction which produces a polymer resin in a fluid bed reactor, wherein the polymer resin has a dry melt reference temperature (a temperature, sometimes referred to herein as a "dry MRT," characteristic of melting behavior of a dry version of the polymer resin); and (b) in response to data indicative of at least one monitored parameter of the reaction, determining, in on-line fashion, a reduced melt reference temperature (sometimes referred to herein as "$MRT_R$") characteristic of the melting behavior of the polymer resin as it exists in the reactor.

The reduced melt reference temperature ("$MRT_R$") is a temperature characteristic of melting behavior of the polymer resin the presence of diluent (e.g., condensable diluent gas or gases) with the resin in the reactor, and is at least substantially equal to the difference between the dry MRT and a melt reference temperature depression value, "D," where D is a temperature by which the dry MRT is depressed by the presence of diluent (e.g., condensable diluent gas or gases) with the resin in the reactor. In some embodiments, the method also includes the step of determining a stickiness control parameter from the reduced melt reference temperature. Typically, the stickiness control parameter is a temperature (sometimes referred to herein as a "$\Delta MRT$" value) at least substantially equal to $MRT_R-Trx$ (or $Trx-MRT_R$), where Trx is current reactor temperature.

Optionally, the method also includes the step of controlling the reaction in response to the reduced melt reference temperature or stickiness control parameter (e.g., in response to a $\Delta MRT$ value), for example by maintaining bed temperature in a predetermined relation with (e.g., below) the reduced melt reference temperature or a temperature (or temperature range) related to the reduced melt reference temperature.

The dry MRT is a distinct and measurable temperature that is characteristic of melting behavior of a dry version of the polymer resin, and can be defined or determined in any of a variety of different ways, including as:

a peak melt temperature as determined from a first or second melt DSC ("differential scanning calorimetry") measurement on a dry sample of the polymer resin;

a polymer Seal Initiation Temperature measured on a resin film sample;

a resin Hot Tack Initiation Temperature;

a dry sticking temperature of granular polymer in a fluid bed;

a dry Melt Initiation Temperature (MIT) determined graphically as the onset of rapid melting in a first or second melt DSC curve determined from a DSC measurement on a dry sample of the polymer. Such a dry MIT is preferably determined from a first melt DSC measurement on a sample of a dry version of the polymer (a sample of the polymer resin with no significant amount of diluent hydrocarbon present therewith); or a temperature at which the polymer resin is expected to melt or begin to melt in the reactor vessel with the reactor operating at normal pressure and gas velocity but in the presence of substantially pure nitrogen rather than the gas components actually present with the resin in the reactor during the reaction.

In typical embodiments, reference temperature data (indicative of the reduced melt reference temperature) are generated in on-line fashion in accordance with the invention by processing data indicative of a combination of process variables measured during the reaction (e.g., current values of bed temperature, density and melt index of the polymer resin, and concentration (e.g., partial pressure) of ICA, comonomer, and isomer gas, and optionally also at least one other diluent present in the reactor) in accordance with a predetermined model. The processing can be performed in any of a variety of ways, including by accessing at least one database or look-up table prepared in accordance with the model. Typically, a dry melt reference temperature is determined from the measured process data (e.g., using a predetermined correlation with melt index and/or density of the resin), and appropriate correlations (provided by the model) are employed to estimate a degree of reduction of the dry melt reference temperature due the effects of diluent components present in the reactor with the polymer resin during the reaction.

In typical embodiments, to implement a model of the type mentioned in the previous paragraph, data indicative of a dry melt reference temperature of each of a representative set of different types or grades of polymer resin that may be produced in the reactor are measured. Preferably, the density and melt index of the polymers in the set span a full range of polymer density and melt index values that may be produced using each catalyst type that may be used in the process. The measured data are typically then analyzed (and regressed) to provide a mathematical correlation of dry melt reference temperature as a function of polymer density and melt index, and also catalyst type (if required). Measured data indicative of the density and melt index of the polymer being produced, and also data indicative of the type of catalyst being used to produce the polymer (if required), can then be processed in on-line fashion using the correlation to determine a dry melt reference temperature for the polymer resin. Alternatively, dry melt reference temperature data, provided in the form of a predetermined database (a "Melt Reference Database") or look-up table, are accessed to identify a dry melt reference temperature for the polymer resin being produced. The database or look-up table would preferably contain dry melt reference temperature data for each grade of polymer to be produced in the reactor, so that the data can be conveniently accessed in on-line fashion by specifying density and melt index of the polymer being produced (and the catalyst being used in the polymerization reaction if required).

Typically, a model of the type mentioned in the two previous paragraphs predicts the amount by which the dry melt reference temperature (of a dry version of the polymer resin being produced in the reactor) is reduced by the presence with the resin of condensable diluent gas (e.g., ICA, comonomer, and isomer(s) of at least one comonomer) used in the reaction. At least one parameter monitored in step (a) is processed in accordance with the model to generate reference temperature data, which in turn determine the reduced melt reference temperature.

Reference temperature data generated in on-line fashion in accordance with the invention can be provided to and processed by (i.e., integrated with) a plant process control system to provide an on-line monitor of the approach to at least one condition of undesirable resin stickiness in the reactor. Such an on-line monitor can provide a quantitative basis for control of process conditions to avoid continuity problems that would otherwise occur due to excessive stickiness of resin in the reactor, and can allow a plant operator to operate the process safely at conditions closer to the stickiness limits for higher reactor heat transfer capabilities and higher production rates.

During reaction transitions, conditions in fluid bed reactor are adjusted (e.g., to cause production of polymer of a different grade, such as polymer of different density and/or melt index). In most cases, the adjustments in process conditions can be made fairly quickly, but some time is needed for the fluid bed to change over to the new resin properties. The time required to effect a complete transition is typically three or four bed turnovers. During a reaction transition, the bed-averaged properties (e.g., resin density and melt index) are not equal to the properties of the resin currently being produced (the "instantaneous production"). Therefore, it is possible for reference temperature data generated in accordance with the invention to be indicative of two different stickiness control parameters: one calculated with properties of bed-averaged resin, and one calculated with instantaneous values of the properties of the instantaneous production. In some embodiments, the reference temperature data are indicative of two stickiness control parameters: a "$\Delta MRT_{ave}$" temperature indicative of the difference between the current reactor temperature and a reference temperature above which resin having bed-averaged resin properties in the reactor is predicted to become sticky; and a "$\Delta MRT_{inst}$" temperature indicative of the difference between the current reactor temperature and a reference temperature above which the resin currently being produced in the reactor is predicted to become sticky. For reliable operation (without excessive resin stickiness) the reaction is preferably controlled (at least during the transition) so that neither the "$\Delta MRT_{ave}$" temperature nor the "$\Delta MRT_{inst}$" temperature exceeds a predetermined limit or leaves a predetermined range. The predetermined limit or range for $\Delta MRT_{ave}$ may differ from that for $\Delta MRT_{inst}$.

Preferred embodiments determine stickiness control parameters based on bed-averaged parameters of steady-state polymerization reactions and use them to characterize and preferably also control the steady-state reactions. During transitions of such reactions, preferred embodiments of the invention determine stickiness control parameters based on instantaneous reaction parameters and use them to characterize and preferably also control the reactions during the transitions. For example, a steady-state reaction can be controlled to proceed with an stickiness control parameter relatively close to a critical (or limiting) $\Delta MRT$ value (e.g., a critical $\Delta MRT$ value at least substantially equal to $Trx-MRT_R$, where Trx is the current reactor temperature and $MRT_R$ is at least substantially equal to MRT-D, where MRT is dry melt reference temperature for a dry version of the polymer resin being produced, and D is an estimated temperature (determined in accordance with the invention) by which MRT is depressed by the presence of condensable diluent gas with the resin during the reaction, so that $MRT_R$ is limiting temperature value beyond which resin stickiness is likely to occur).

However, during a transition in such a reaction, the reaction should typically be controlled to proceed with a stickiness control parameter relatively far from the critical $\Delta MRT$ value determined in accordance with the invention. For increased safety and more reliable operation without resin stickiness, the reaction should be controlled such that neither a "$\Delta MRT_{ave}$" temperature (indicative of the difference between current reactor temperature and a reference temperature above which resin having bed-averaged resin properties in the reactor is predicted to become sticky) nor a "$\Delta MRT_{inst}$" temperature (indicative of the difference between current reactor temperature and a reference temperature above which the resin currently being produced in the reactor is predicted to become sticky) exceeds a predetermined limit or leaves a predetermined range. The predetermined limit or range for $\Delta MRT_{ave}$ may differ from that for $\Delta MRT_{inst}$.

When controlling a reaction to prevent a stickiness control parameter (generated in accordance with the invention) from exceeding a critical $\Delta MRT$ value (or leaving a critical $\Delta MRT$ range) the reactor temperature or ICA concentration may be adjusted (typically lowered) to bring the stickiness control parameter back into an acceptable range. Adjustments in the reactor temperature Trx are generally preferred because of the relatively quick response times involved. If, for example the calculated value of the stickiness control parameter were too high by 1° C., a reduction in reaction temperature of 1° C. would bring the stickiness control parameter back within range within a few minutes. Alternatively, an excessively high stickiness control parameter may be corrected by lowering the concentration (or partial pressure) of ICA in the reactor. This may be done, for example, by reducing the rate of ICA feed to the reactor, or by increasing the rate of venting from the reactor. In either case, the rate of change in ICA concentration (or partial pressure) is relatively slow, normally requiring several hours to effect the intended change. For this reason, adjustments in the reactor temperature are generally preferred.

BRIEF DESCRIPTION OF THE DRAWINGS

FIG. 1 is a simplified cross-sectional view of a reaction system including a fluidized bed reactor (10), whose operation can be monitored and optionally also controlled in accordance with the invention.

FIG. 2 is a block diagram of some elements of the FIG. 1 system and additional elements for implementing a process for calculating control variables $MRT_R$ and $\Delta MRT$. These parameters can be calculated using on-line data from the reaction system and can be used to provide a real-time estimate of the degree of resin stickiness in the fluidized bed.

FIG. 3 is a first melt DSC curve generated from measured data for the polymer and catalyst listed in Row 6 of Table 1. A dry MIT value of 97.4° C. was determined from the initial inflection point of the DSC curve as shown in the figure.

FIG. 4 is the DSC curve of FIG. 3 and another first melt DSC curve that shows the effect of dissolved hydrocarbons in displacing (or "depressing") the DSC curve of FIG. 3 to lower values of temperature. The dissolved hydrocarbons also produce a reduction of the MIT to a lower value, denoted as $MIT_R$ as shown. The shift (or displacement) of MIT values (D) is computed using the Flory equation.

FIG. 5 is a first melt DSC curve with indications that illustrate a calculation of the control variable $\Delta MIT$ as the difference between the reactor temperature (Trx) and the shifted value of the melt initiation temperature $MIT_R$.

DETAILED DESCRIPTION OF PREFERRED EMBODIMENTS

A reactor system whose operation can be monitored and optionally also controlled in accordance with the invention will be described with reference to FIG. 1. The FIG. 1 system includes fluidized bed reactor 10. Reactor 10 has a bottom end 11, a top expanded section 19, a cylindrical (straight) section 14 between bottom end 11, and a distributor plate 12 within section 14. A fluidized bed 15 of granular polymer and catalyst particles is contained within the straight section 14. The bed is fluidized by the steady flow of recycle gas through the distributor plate 12. The flow rate of fluidizing gas is regulated to provide the fluidized bed with relatively good mixing, as illustrated in the figure.

The reactor system also has a catalyst feeder 9 for controlled addition of polymerization catalyst to the fluidized bed reaction zone. Within the reaction zone (i.e. the fluidized bed), the catalyst particles react with the ethylene and comonomer and optionally other reaction gas to produce granular polymer particles. As new polymer particles are produced, other polymer particles are continually withdrawn from the fluidized bed through a product discharge system (not shown). After passing through the product discharge system, the polymer granules are degassed (or "purged") with a flow of inert nitrogen to remove substantially all of the dissolved hydrocarbon materials.

The reactor system of FIG. 1 also has a cooling control loop which includes a recycle gas line 31, a circulating gas cooler 30 and compressor 32, coupled with reactor 10 as shown. During operation, the cooled circulating gas from cooler 30 flows, through inlet 34 into reactor 10, then propagates upward through the bed and out from reactor 10 via outlet 33.

The expanded section 19 is also known as the "velocity reduction zone", and is designed to minimize the quantities of particle entrainment from the fluidized bed. Each diameter of each horizontal cross-section of the expanded section 19 is greater than the diameter of straight section 14. The increased diameter causes a reduction in the speed of the fluidizing gas, which allows most of the entrained particles (catalyst and resin particles) to settle back into the fluidized bed, thereby minimizing the quantities of solid particles that are "carried over" from the fluidized bed (at a given value of fluidizing gas velocity) through the recycle gas line 31.

One or more temperature sensors 16 may be located in the fluidized bed, and are used with a control system (not shown in FIG. 1 but which can include processor 50 of FIG. 2) and an external cooling loop to control the fluidized bed temperature Trx near the process set-point. Relatively warm reactor gases (whose temperature has increased during its flow through reactor 10) is withdrawn from outlet 33 and is pumped by compressor 32 to cooler 30, wherein the temperature of the gas (the cooling fluid) is reduced. The relatively cool fluid from the cooler (which may contain condensed liquid) flows to the reactor inlet 34, to cool the fluidized bed. Temperature sensors (not shown) near the inlet and outlet of cooler 30 may provide feedback to the control system to regulate the amount by which cooler 30 reduces the temperature of the fluid entering the reactor.

The FIG. 1 system also includes "skin temperature" sensors 8 mounted in positions along straight section 14 of the reactor wall so as to protrude into the bed from the reactor wall by a small amount (e.g., one eighth to one quarter of an inch). Sensors 8 are configured and positioned to sense the temperature $T_{wo}$ of the resin near the wall of reactor 10 during operation.

The one or more temperature sensors 16 in the fluidized bed can include at least one resistance temperature sensor positioned and configured to sense bed temperature during reactor operation at a location within reactor 10 away from the reactor wall. The resistance temperature sensor can be mounted so as to protrude into the bed (e.g., 8 to 18 inches away from the reactor wall) more deeply than do sensors 8.

Other sensors and optionally also other apparatus may be employed to measure other reaction parameters during a polymerization reaction. Such other reaction parameters preferably include instantaneous and bed-averaged resin product properties (e.g., melt index and density of the polymer resin product being produced by the FIG. 1 system during a polymerization reaction). Resin product properties are conventionally measured by periodically sampling the resin as it exits the reactor (e.g. once per hour), and performing the appropriate tests in a quality control laboratory.

Other measured reaction parameters preferably include reactor gas composition, e.g., concentrations (and partial pressures) of all reactant gases and induced condensing agents (ICAs), as well as all inert gases (such as nitrogen, hydrocarbon inerts, etc.) that are present in relevant quantities. The reactor gas composition may be measured with a gas chromatograph system 40.

It is well known how to control various process control variables (e.g., to control gas phase composition within reactor 10, the concentration of induced condensing agents (ICAs) and comonomer introduced into reactor 10, partial pressure of at least one reactant (e.g., ethylene) introduced into reactor, and the type and properties of each catalyst introduced into reactor 10, and to use elements 30 and 32 in the manner described above to control temperature) to control various reactions performed by the FIG. 1 system. For example, it is known how to control a polymerization reaction during a transition by controlling process control variables such that the product (granular polymer resin) has properties compliant with an initial specification set at the start of the transition, the product produced during the transition ceases to comply with the initial specification set at a first time, and the product has properties compliant with a final specification set at the end of the transition.

In typical embodiments of the invention, a reaction (e.g., a steady-state reaction and/or a reaction transition) performed by a polymerization reactor is controlled by adjusting (or regulating) controlling process variables in response to at least one new control variable determined in accordance with the invention. One or more new control variables of the invention (e.g., $MRT_R$ and $\Delta MRT$ values as defined herein) are determined based on the output of sensors (and optionally also other apparatus) that measure reaction parameters. Processor 50 of FIG. 2 is an example of a processor programmed to generate such new control variables in accordance with any embodiment of the invention in response to reaction parameters (e.g., parameters determined by the output of temperature sensor 16, resin properties measurements (density and MI), and the process gas chromatograph 40) measured during a reaction, and to control the reaction in response to these temperature values. Processor 50 may be a separate, stand alone processor, or it may be integral with other process control computers that are conventionally used to monitor and control the reactor system.

In a class of embodiments, the invention is a method including the steps of:

(a) monitoring a polymerization reaction which produces a polymer resin in a fluid bed reactor (e.g., reactor 10), wherein the polymer resin has a dry melt reference temperature, and the dry melt reference temperature (sometimes referred to herein as a "dry MRT") is a temperature characteristic of melting behavior of a dry version of the polymer resin; and (b) in response to data indicative of at least one monitored parameter of the reaction, determining, in on-line fashion, a reduced melt reference temperature (sometimes referred to herein as "$MRT_R$") characteristic of the melting behavior of the polymer resin as it exists in the reactor. The reduced melt reference temperature ("$MRT_R$") is a temperature characteristic of melting behavior of the polymer resin the presence of diluent (e.g., condensable diluent gas or gases) with the resin in the reactor; and is at least substantially equal to the difference between the dry MRT and a melt reference temperature depression value, "D," where D is a temperature by which the dry MRT is depressed by the presence of diluent with the resin in the reactor. In some embodiments, the method also includes the step of determining a stickiness control parameter from the reduced melt reference temperature. Typically, the stickiness control parameter is a temperature (sometimes referred to herein as a "$\Delta MRT$" value) at least substantially equal to $MRT_R$-Trx (or Trx-$MRT_R$), where Trx is current reactor temperature.

Optionally, the method also includes the step of controlling the reaction in response to the reduced melt reference temperature or stickiness control parameter (e.g., in response to a $\Delta MRT$ value), for example by maintaining bed temperature in a predetermined relation with (e.g., below) the reduced melt reference temperature or a temperature (or temperature range) related to the reduced melt reference temperature.

The dry MRT is a distinct and measurable temperature that is characteristic of melting behavior of a dry version of the polymer resin, and can be defined or determined in any of a variety of different ways, including as:

a peak melt temperature as determined from a first or second melt DSC ("differential scanning calorimetry") measurement on a dry sample of the polymer resin;

a polymer Seal Initiation Temperature measured on a resin film sample;

a resin Hot Tack Initiation Temperature;

a dry sticking temperature of granular polymer in a fluid bed;

a temperature at which the polymer resin is expected to melt or begin to melt in the reactor vessel with the reactor operating at normal pressure and gas velocity but in the presence of substantially pure nitrogen rather than the gas components actually present with the resin in the reactor during the reaction; or a dry Melt Initiation Temperature (MIT) determined graphically as the onset of rapid melting in a first or second melt DSC curve determined from a DSC measurement on a dry sample of the polymer. Such a dry MIT is preferably determined from a first melt DSC measurement on a sample of a dry version of the polymer (a sample of the polymer resin with no significant amount of diluent hydrocarbon present therewith).

Below (with reference to FIGS. 3-5 and Equations 1-15), we shall describe exemplary embodiments of the invention in which the dry MRT is a dry melt initiation temperature ("dry MIT") determined graphically as the onset of rapid melting in a first or second melt DSC curve determined from a DSC measurement on a dry sample of polymer resin of the type being produced. In these exemplary embodiments, the reduced melt reference temperature is a reduced melt initiation temperature ("$MIT_R$") that is at least substantially equal to the difference between the dry MIT and a melt reference temperature depression value, "D," where D is a temperature by which the dry MIT is depressed by the presence of diluent (e.g., condensable diluent gas or gases) with the resin in the reactor. The exemplary embodiments also include the step of determining a stickiness control parameter (sometimes referred to herein as "$\Delta MIT$" or a "$\Delta MIT$" value) at least substantially equal to $MIT_R$-Trx (or Trx-$MIT_R$), where Trx is current reactor temperature. In the exemplary embodiments, reference temperature data generated in on-line fashion in accordance with the invention are generated by processing data indicative of a combination of process variables measured during the reaction (e.g., current values of bed temperature, density and melt index of the polymer resin, and concentration (e.g., partial pressure) of ICA, comonomer, and isomer gas, and optionally also at least one other diluent present in the reactor) in accordance with a predetermined model (e.g., a MIT depression model that implements the Flory equation). The processing can be performed in any of a variety of ways, including by accessing at least one database or look-up table prepared in accordance with the model.

In the exemplary embodiments, a dry melt reference temperature is determined from measured process data (using a predetermined correlation with melt index and/or density of the resin), and appropriate correlations (provided by the model) are employed to estimate a degree of reduction of the dry melt reference temperature due the effects of diluent components present in the reactor with the polymer resin during the reaction.

Reference temperature data generated in on-line fashion in accordance with the invention (e.g., in accordance with the exemplary embodiments) can be provided to and processed by (i.e., integrated with) a plant process control system to provide an on-line monitor of the approach to at least one condition of undesirable resin stickiness in the reactor. Such an on-line monitor can provide a quantitative basis for control of process conditions to avoid continuity problems that would otherwise occur due to excessive stickiness of resin in the reactor, and can allow a plant operator to operate the process safely at conditions closer to the stickiness limits for higher reactor heat transfer capabilities and higher production rates.

FIG. 4 illustrates the effect of dissolved hydrocarbons in shifting (or "displacing" or "depressing") a polymer melt curve. The effect of these dissolved components, principally dissolved comonomer and ICA, is assumed in the present work to displace the entire melt curve (shown in FIG. 3 and also shown as a dashed curve in FIG. 4) towards lower temperatures, resulting in the displaced curve indicated in FIG. 4. The polymer peak melting temperature is displaced downwards, along with the MIT. The amount of displacement is denoted as D (in units of temperature, ° C.), and in the exemplary embodiments to be described below is calculated using the Flory equation and appropriate data (or correlations) for the solubility of condensable hydrocarbons in the polymer. The displaced (reduced) value of MIT is denoted as $MIT_R$.

FIG. 5 illustrates a calculation of the stickiness control parameter $\Delta MIT$ in accordance with the exemplary embodiments to be described below. This parameter is computed as $\Delta MIT$=Trx-$MIT_R$, and represents the extent by which the reactor bed temperature exceeds (or "overlaps") the displaced (reduced) value of the MIT. The physical units of $\Delta MIT$ are temperature, in degrees C. The $\Delta MIT$ incorporates all known process variables that affect resin stickiness (e.g., resin density and MI, reactor temperature Trx, and hydrocarbon concentrations and solubilities) into a single variable that can be monitored on-line (during a reaction) and used as the basis for control of the reactor to prevent problems associated with excessive stickiness, and/or to maximize reactor production rates. Limiting values of $\Delta MIT$ correspond to limiting values of stickiness, and may be different for different catalyst systems. For polymers produced with Catalyst A (a metallocene catalyst described below) the limiting value of ΔMIT was determined to be in the range of 6 to 7° C.

The exemplary embodiments of the present invention determine an estimated degree of depression of a dry melt initiation temperature for a polymer resin due to presence of at least one diluent (e.g., ICA, comonomer, and at least one isomer of the comonomer) with the resin in a reactor during a polymerization reaction, from at least one parameter of the reaction monitored on an on-line basis and using a predetermined melt initiation temperature depression model (e.g., one based on and implementing the Flory equation). As discussed above, the presence of condensable diluent (e.g., comonomer and condensing agents, and isomers of comonomers) depresses the dry melt initiation temperature of polymer resin (e.g., polyethylene) in a gas phase polymerization reactor. The magnitude of the depression of the dry melt initiation temperature may be sufficient to bring the reduced melt initiation temperature near the reaction temperature. The model employed in the noted embodiments relates the dry melt initiation temperature of a dry version of the polymer resin (which itself is typically determined by a predetermined correlation with resin melt index and density) and the reduced melt initiation temperature of the polymer resin in the presence of significant amounts of the diluent components (typically soluble hydrocarbons) that are present with the resin while the resin is produced. By processing data indicative of the reactor temperature, and the concentration, solubility, and liquid densities of the diluent components in accordance with the model, the reduced melt initiation temperature can be determined in accordance with the invention from the dry melt initiation temperature. Such a model (sometimes referred to herein as a melt initiation temperature depression model or MIT depression model) can be readily programmed into a stand-alone computer or a conventional plant DCS system to provide an on-line monitor of combinations of process conditions that lead to resin stickiness. This allows operations to adjust reactor conditions to avoid stickiness and reduce the likelihood of sheeting incidents.

The noted embodiments include the steps of: determining a dry melt initiation temperature for polymer resin being produced, preferably by characterizing a DSC (differential scanning calorimetry) melting curve for a dry version of the resin being produced; and estimating the amount by which the dry melt initiation temperature is depressed due to the presence of the condensable diluent component(s) actually present with the resin being produced in the reactor. In characterizing such a DSC melting curve, an inflection point in the DSC melting curve is typically identified as the dry melt initiation temperature (MIT). Using the Flory equation, these embodiments determine a reduced melt initiation temperature ($MIT_R$) at which the resin in the reactor will begin to melt in the presence of the condensable diluent gases (e.g., soluble hydrocarbons) that are present with the resin during the reaction. The reduced melt initiation temperature, $MIT_R$, is at least substantially equal to MIT−D, where MIT is the dry melt initiation temperature, and D is an estimated degree of MIT depression, caused by the soluble diluent gas components in the reactor.

The methodology for estimating the depression "D" of the dry melt initiation temperature may be based on the Flory equation and existing models for vapor solubility in the polymer resin. The noted embodiments typically determine a single calculated parameter, ΔMIT, which is the difference between the reactor temperature, Trx, and $MIT_R$, to quantify the degree to which the reactor temperature overlaps the (depressed) melting curve and thus quantify the degree of resin stickiness.

The expression "DSC melting curve" for dry version of polymer resin herein denotes an experimentally determined relationship between the rate at which heat is absorbed by a sample of the dry resin (e.g., in units of mcal/sec) versus temperature of the sample, as determined from DSC melting curve data resulting from differential scanning calorimetry measurements on the sample. Two types of DSC melting curves are "first melt" and "second melt" curves. A first melt curve is determined by measurements on a sample that has not previously been melted. A second melt curve is determined by measurements on a sample that has previously been melted, in the sense that the sample is melted in a first scan through the DSC, then cooled back to ambient temperature, and then slowly reheated for the second DSC test. DSC melting curves employed in preferred embodiments of the invention are first melt curves, since first melt data are believed to reflect the true melt curve of polymer resin as it exists in a polymerization reactor more accurately than second melt data.

Some embodiments of the inventive method implementing a melt initiation temperature depression model include the steps of:

(a) during a polymerization reaction in a fluid bed reactor that produces a polymer resin, measuring current values of parameters of the reaction including reactor temperature, at least one resin property (e.g., density and melt index) of the polymer resin, and concentration (e.g., partial pressure) of at least one condensable diluent gas in the reactor (e.g., partial pressures of ICA, comonomer, and at least one isomer of the comonomer in the reactor);

(b) determining, from at least one of the current values of the at least one resin property based on a predetermined correlation between resin melting temperature and said at least one resin property, a dry melt initiation temperature value ("dry MIT value" or "MIT") indicative of a temperature at which a dry version of the polymer resin is expected to begin to melt (e.g., a temperature at which the polymer resin in the reactor is expected to begin to melt in the absence of any significant amount of condensable diluent gas that is actually present in the reactor during the reaction). Typically, the dry MIT value is determined using a database including previously measured MIT values (determined from DSC measurements) as a function of resin properties (density, MI, etc.);

(c) during the reaction, using a melt initiation temperature (MIT) depression model to determine in on-line fashion a reduced melt initiation temperature at which the polymer resin is expected to begin to melt in the presence of the at least one condensable diluent gas in the reactor, said model identifying an estimated degree of depression of the dry MIT value due to presence of at least one diluent with the polymer resin (e.g., the presence of the condensable diluent gas actually present with the polymer resin in the reactor during the reaction). Preferably, the MIT depression model implements the Flory equation; and (d) determining in on-line fashion a temperature value indicative of resin stickiness in the reactor, from the reduced melt initiation temperature determined in step (c) and a current value of the reactor temperature.

Steps (b) and (c) can be performed in any of a variety of ways, including by accessing one or more look-up tables prepared in accordance with the predetermined correlation or the model.

Typically, the reduced melt initiation temperature determined in step (c) is a temperature ($MIT_R$) above which resin in the reactor (in the presence of condensable diluent gas) is predicted to begin to melt. In some embodiments, the temperature value generated in step (d) is a temperature value, ΔMIT, which is at least substantially equal to $Trx-MIT_R$, where Trx is the current reactor temperature, and $MIT_R$ is the reduced melt initiation temperature determined in step (c). Typically, $MIT_R$ is at least substantially equal to MIT−D, where MIT ("melt initiation temperature") is the dry MIT value determined in step (b), D is an estimated degree of MIT depression due to the presence of the at least one condensable diluent gas with the resin in the reactor. In other embodiments, the temperature value generated in step (d) is a temperature value otherwise indicative of the degree of resin stickiness in the fluid bed.

Preferably, steps (a)-(d) are performed repeatedly (e.g., on an ongoing basis) during the reaction to generate a sequence of temperature values indicative of resin stickiness in the reactor (e.g., a sequence of values of ΔMIT or data indicative of a time-varying value of ΔMIT), and the method also includes the step of:

(e) controlling the reaction to in an effort to prevent unacceptable resin stickiness in the reactor (e.g., to maintain a current value of ΔMIT in a predetermined relationship with a predetermined limiting temperature value or range of values).

For some embodiments in which the reaction controlled in step (e) is a polyethylene polymerization reaction using a metallocene catalyst to be referred to as Catalyst A (described below), and the temperature value generated in step (d) is a temperature value ΔMIT which is at least substantially equal to Trx−$MIT_R$. Such a temperature value ΔMIT has been correlated with measured data characterizing the same type of polyethylene polymerization reaction (performed using Catalyst A) at a commercial gas phase reactor. The data characterized several wall and dome sheeting incidents that occurred during the reaction, as well as normal operation that occurred without sheeting. The correlation determined that when the ΔMIT value exceeded a critical value (determined to be in the range 6° C. to 7° C.), the likelihood of sheeting increased significantly. The correlation also determined that maintaining the ΔMIT value below this critical value is critical to avoid both wall and dome sheeting during a reaction of the type analyzed. Thus, in the noted embodiments, step (e) preferably maintains (or attempts to maintain) the reaction parameters so that ΔMIT is in a predetermined limiting range from 5° C. to 6° C. (or less than a predetermined limiting value from 6° C. to 7° C.).

For some other polyethylene polymerization reactions using a catalyst other than above-noted Catalyst A, the temperature value generated in step (d) is a temperature value ΔMIT which is at least substantially equal to Trx−$MIT_R$, and step (e) maintains (or attempts to maintain) the reaction parameters so that ΔMIT is in a predetermined limiting range which is found (in commercial experience) to be appropriate for that catalyst. With these other catalyst systems the range of ΔMIT values required to avoid excessive resin stickiness may be different than 5° C. to 6° C. The limiting ΔMIT values (or range of values) for these catalysts are taken as those that are found to correlate with discontinuity events (sheeting, chunking and/or rapid fouling of the distributor plate) with the particular catalyst in a commercial reactor system.

We next describe an example of performance of step (c), assuming that a dry melt initiation temperature value has been determined in step (b).

From thermodynamic considerations, the presence of a soluble, condensable substance (e.g., a hydrocarbon) reduces the melting temperature of a polymer. A relationship, known as the Flory equation, for the melting point depression of a high molecular weight polymer by a diluent is given in Fried, J. R., *Polymer Science and Technology*, Prentice Hall, Upper Saddle River, N.J., 1995, as:

$$\frac{1}{T_m} - \frac{1}{T_m^0} = \left(\frac{R}{\Delta Hu}\right)\left(\frac{Vu}{Vs}\right)(\phi_1 - \chi\phi_1^2) \quad (1)$$

where:
R is the gas constant,
Vu is the molar volume of the polymer repeat unit,
Vs is the molar volume of the diluent,
$T_m$ is the peak melting temperature of the polymer with diluent (° C.),
$T_m^0$ is the peak melting temperature of the polymer without diluent (° C.),
ΔHu is the enthalpy of fusion for the polymer repeat unit (850.6 cal/mol),
$\phi_1$ is the volume fraction of diluent (single or multi-component), and
χ is a binary interaction parameter.

The parameter χ is defined by the above reference as:

$$\chi = \chi_S + \chi_H = \chi_S + \frac{V_1}{RT}(\delta_1 - \delta_2)^2 \approx 0.34 + \frac{V_1}{RT}(\delta_1 - \delta_2)^2 \quad (2)$$

where:
$\delta_1$ is the solubility parameter of the diluent, and
$\delta_2$ is the solubility parameter of the polymer.
For a diluent that is a mixture of gases:

$$\delta_1 = \delta_{mix} = \Sigma \delta_i f_i \quad (3)$$

where $f_i$ is the volume fraction of diluent component i, and $\delta_i$ is the solubility parameter of component i, and where the sum of volume fractions for all diluent components equals 1. Equation 3 is substituted into Equation 2 to calculate χ for mixtures.

Solving for Tm in Equation 1, the following expression is obtained:

$$Tm = \frac{1}{\frac{1}{Tm^0 + 273.15} + \left[\frac{R}{\Delta Hu} \cdot \frac{Vu}{Vs} \cdot (\phi_1 - \chi \cdot \phi_1^2)\right]} - 273.15 \quad (4)$$

This equation predicts the peak melting temperature of a polymer as a function of soluble components. In the example, $T_m^0$ is the peak melt temperature determined from a first melt DSC curve for the polymer, and $T_m^0$ is the peak melt temperature expected for the polymer in the presence of the diluent. From thermodynamic considerations, the effect of the soluble diluents is to reduce (or "depress") the peak melting temperature, hence $T_m$ is always less than $T_m^0$ in the presence of one or more soluble diluents, and the difference $T_m^0 - T_m$ is always positive.

In the present example, it is necessary to estimate the degree of depression of the melt initiation temperature, MIT. The required depression of the MIT is taken as equal to the depression of the peak melting temperature, as determined above from the Flory equation. Defining the parameter D as the depression (or displacement) of the melt initiation temperature, $$D = T_m - T_m^0 \quad (5)$$

The reduced melt initiation temperature is determined in step (c) from the melt initiation temperature (determined in step (b)) as $$MIT_R = MIT - D \quad (6)$$

In the example, the temperature value generated in step (d) is a temperature value $\Delta MIT=Trx-MIT_R$, where Trx is the current reactor temperature, and $MIT_R$ is given by Equation 6. The value $\Delta MIT$ is the difference between the reactor temperature (Trx) and the melt initiation temperature of the polymer, accounting for the depression in melting point for soluble hydrocarbons. A positive value of $\Delta MIT$ indicates the extent to which the reactor temperature exceeds the depressed melt initiation temperature.

In order to use Equation 4, relationships for the solubility of diluent components in the polymer are required. One such generalized relationship, described in Stiel, L. I., et al., *J. Appl. Poly. Sci.*, v. 30, 1145-1165, 1985, provides an estimate of a Henry's Law constant as:

$$\ln\left(\frac{1}{Kp}\right) = -1.561 + (2.057 + 1.438\omega)\left(\frac{Tc}{T}\right)^2 \quad (7)$$

where:

Kp is the Henry's Law constant,

ω is an acentric factor,

Tc is the critical temperature of the diluent (° K.), and

T is the temperature (° K.).

To calculate the vapor solubility, the following equation was presented by Stiel, et al, (cited above):

$$Py_1 = Kp \cdot V_1^0 \quad (8)$$

where:

P is the reactor total pressure (atm), $y_1$ is vapor phase mole fraction, and $V_1^0$ is vapor solubility in $cm^3$ diluent/g polymer at 273.2° K. and 1 atmosphere pressure.

By combining Equations 7 and 8, the vapor solubility of diluent (in units of weight fraction) can be expressed as:

$$S = P \cdot Mw \cdot \frac{\exp\left(-1.561 + (2.057 + 1.438\omega)\left(\frac{Tc}{T}\right)^2\right)}{R \cdot Ta} \quad (9)$$

where:

Ta is 273.15 (° K.),

R is the gas constant (82.06 $cm^3 \cdot atm/mol \cdot$° K.), and

Mw is the molecular weight of the diluent, or:

$$S = P \cdot Mw \cdot \frac{\exp\left(-1.561 + (2.057 + 1.438\omega)\left(\frac{Tc}{T}\right)^2\right)}{22414.7} \quad (10)$$

If P is in units of bars (rather than atmospheres), the constant in the denominator of Equation 10 is 22710.9.

Component properties, such as Tc, ω and Mw may be found in Reid, R. C., et al., *The Properties of Gases and Liquids*, 4th ed., McGraw-Hill, New York, 1987.

To calculate the melting point depression by Equation 4, the volume fraction of diluent φ in the polymer must be estimated. Assuming additive volumes, the following relationship applies:

$$\phi_{mix} = \frac{\frac{Ms}{\rho s}}{\frac{Ms}{\rho s} + \frac{1-Ms}{\rho_p}} \quad (11)$$

where:

Ms is the mass fraction of diluent, $\rho_s$ is the density of the diluent (in $g/cm^3$), and $\rho_p$ is the density of the polymer (in $g/cm^3$)

Other vapor solubility equations can be used as alternatives to Equation 10. For example, for polymerization reactions in which ethylene is present and isopentane is used as a diluent, the following relationship for vapor solubility S (in units of weight fraction) can be used:

$$S = a(1-\rho)^{b1} MI^c e^{d/Trx} P^e \quad (12)$$

where MI is the polymer melt index, $I_2$ (g/10 min), ρ is the polymer density ($g/cm^3$), Trx is the reactor temperature (in ° K.), P is the hydrocarbon partial pressure at the resin conditions (in psia), and a, b1, c, d, and e are predetermined parameters.

As another example, for polymerization reactions in which 1-butene and 1-hexene are diluents, the following relationship for vapor solubility S (in units of weight fraction) can be used:

$$S = aPe^{\left((b1+\frac{b2}{T}-b3)P\right)} e^{c/Trx}(1-\rho)^d MI^e \quad (13)$$

where (again) MI is the polymer melt index ($I_2$, g/10 min), ρ is the polymer density ($g/cm^3$), Trx is the reactor temperature (in ° K.), P is the hydrocarbon partial pressure at the resin conditions (in psia), and a, b1, c, d, and e are predetermined parameters.

In the example, diluent mixture molar volumes are required. Well known methods such as the Rackett method using the Chueh-Prauxnitz mixing rules or the Hankinson-Brobst-Thomson method for mixtures may be used. Molar volumes used herein were calculated using the modified Rackett method using the Chueh-Prausnitz mixing rules (as described in Reid, R. C., et al., *The Properties of Gases and Liquids*, 4th ed., McGraw-Hill, New York, 1987):

To estimate χ in Equation 4, the volume fraction of each soluble component is also required. In the example, the χ parameter was computed by modifying Equation 2 as follows:

$$\chi = 0.34 + \frac{V_1}{RT_{rx}}\left(\sum_i \delta_i \frac{S_i}{\sum_i S_i} - \delta_P\right) \quad (14)$$

where:

$\delta_P$ is polymer solubility parameter, $\delta_i$ is the solubility parameter of diluent component i, $S_i$ is defined by Equation 10, and The temperature T is taken as Trx.

In the example, melt DSC measurements were made for a series of polymers (produced with a variety of catalysts) before step (b) was performed. Table 1 shows the melt index (MI) and density (ρ) of each polymer, the catalyst employed to produce the polymer (and included with the polymer sample measured), and the melt initiation temperature and peak melt temperature determined for the polymer. The density of the polymers ranged from 0.909 to 0.966 g/cm³ and their melt indices ranged from 0.81 to 19.0 g/10 min.

In Table 1 and elsewhere herein polymer density refers to density measured in accordance with ASTM 1505 and ASTM D-1928. A plaque is made and conditioned for one hour at 100° C. to approach equilibrium crystallinity; measurement for density is then made in a density gradient column. The melt index (MI) is measured in accordance with ASTM D 1238-E (190° C., 2.16 kg).

In Table 1 and elsewhere herein, "Catalyst A" is a metallocene catalyst described in PCT Application Publication Number WO9961486A1 (published on Dec. 2, 1999), wherein it is also designated as "Catalyst A." PCT Application Publication No. WO9961486A1 teaches (on page 29) the following method for preparing this catalyst: "Davison grade 948 silica (available from W.R. Grace, Davison Chemical Division, Baltimore, Md.) was dehydrated to 600° C. and used as the support. The dehydrated silica (850 g) was charged into a 2 gal. reactor and 1060 ml of 30 wt % methylaluminoxane (MAO) (available from Albemarle Corporation, Baton Rouge, La.) was added with slow agitation. Toluene (2000 ml) was then charged to the reactor and the mixture was allowed to stir at 150° F. (66° C.) for 4 hours. Following the MAO reaction time, 23 grams of bis-(1,3-methyl-n-butyl cyclopentadienyl) zirconium dichloride was added as a 10 wt % solution in toluene. Reaction time for the bulky ligand metallocene-type catalyst compound was 1 hour after which the catalyst system was dried with N2 under a vacuum. Drying time was 3 hours at 150° F. (66° C.) and at a reduced agitator speed of 30 rpm. A total of 1200 grams of dried free flowing catalyst was isolated."

In Table 1 and elsewhere herein, "Catalyst B" is a metallocene catalyst described in PCT Application Publication Number WO9961486A1 (published Dec. 2, 1999). The catalyst is identified as "Catalyst D" in the publication, and is based on a "bulky ligand metallocene-type catalyst compound", dimethylsilyl-bis(tetrahydroindenyl)zirconium dichloride ($Me_2Si(H_4Ind)_2ZrCl_2$), which is available from Albemarle Corporation, Baton Rouge, La." PCT Application Publication No. WO9961486A1 teaches (page 32, line 11, to page 33, line 11) the following method for preparing this catalyst: "The ($Me_2Si(H_4Ind)_2ZrCl_2$) catalyst compound was prepared on Crosfield ES-70 grade silica which is dehydrated at 600° C. having an approximately a 1.0 weight percent water content. The Crosfield ES-70 grade silica having an Average Particle Size of 40 microns is available from Crosfield, Manchester, England. The first step in the manufacture of the supported metallocene-type catalyst above involves forming a precursor solution. 460 lbs (209 kg) of sparged and dried toluene is added to an agitated reactor after which 1060 lbs (482 kg) of a weight percent methylaluminoxane (Albemarle Corp., Baton Rouge, La.) is added. 947 lbs (430 kg) of a 2 weight percent toluene solution of a dimethyl silylbis (tetrahydroindenyl)zirconium dichloride catalyst compound and 600 lbs (272 kg) of additional toluene are introduced into the reactor. The precursor solution is then stirred at 80° F. to 100° F. (26.7 to 37.8° C.) for one hour. While stirring the precursor solution above, 850 lbs (386 kg) of 600° C. dehydrated silica as described above is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl)octadecylamine ($C_{18}H_{37}N(CH_2CH_2OH)_2$) available as Kemamine AS-990 (from) Witco Corporation, Memphis, Tenn., is added together with an additional 10 lbs (50 kg) of a toluene rinse and the reactor contents then mixed for 30 min. while heating to 175° F. (79° C.). After 30 min. vacuum is applied and the catalyst mixture dried at 175° F. (79° C.) for about 15 hours to a free flowing powder. The final catalyst weight was 1200 lbs (544 kg) and had a Zr wt % of 0.35 and an Al wt % of 12.0."

In Table 1 and elsewhere herein, "Catalyst C" is a supported Ziegler-Natta catalyst prepared according to U.S. Pat. No. 4,302,566. This catalyst is prepared in three steps. In the first step, W.R. Grace & Co. 955 silica dehydrated at 600° C. is reacted with triethylaluminum ($AlEt_3$) at 60° C. in isopentane, solvent is removed and the resulting product is dried. In the second step, a solution of MgCl2 and TiCl3.1/3AlCl3 dissolved in THF is mixed at 60° C. with the product formed in the first step, solvent is removed and the resulting product is dried to reduce the THF concentration in the product to the range of 0.13 to 0.15. In the third step, the product formed in the second step is reacted with Et2AlCl and Al(n-hexyl)3 at 60° C. in isopentane, the solvent is removed and the product is dried. The quantity of Et2AlCl used in the third step is such that the molar ratio of Et2AlCl/THF is 0.50. The quantity of Al(n-hexyl)$_3$ used in the third step is such that the molar ratio of Al(n-hexyl)3/THF is 0.30.

For each polymer evaluated, only the first melt DSC was used because this is believed to be more representative of the polymer as it exists in the reactor than the more conventional second melt DSC curves. The second melt DSC curves may be significantly different than first melt DSC curves, typically showing lower peak melting temperatures and a sharper melt peak. In the data of Table 2 below, the DSC curves were generated with a temperature ramp rate of 10° C./minute, and with a typical sample quantity of 4.5 mg.

TABLE 1

| Catalyst | Melt Init. Temp (° C.) | Peak Melt Temp (° C.) | Melt Index (dg/min, ASTM) | Density (g/cc, ASTM) |
| --- | --- | --- | --- | --- |
| A | 87.1 | 114.2 | 0.97 | 0.909 |
| A | 86.0 | 110.1 | 7.83 | 0.912 |
| A | 85.1 | 113.3 | 1.03 | 0.913 |
| A | 85.5 | 108.4 | 11.7 | 0.912 |
| A | 86.0 | 110.2 | 5.11 | 0.912 |
| A | 97.4 | 116.1 | 1.04 | 0.917 |
| A | 96.4 | 122.2 | 0.81 | 0.924 |
| A | 95.5 | 113.3 | 3.37 | 0.917 |
| C | 111.2 | 127.5 | 1.9 | 0.942 |
| C | 125.8 | 135.5 | 8.2 | 0.966 |
| C | 97.0 | 121.8 | 1.0 | 0.918 |
| C | 97.7 | 119.5 | 2.0 | 0.918 |
| C | 95.0 | 122.6 | 22 | 0.925 |
| C | 108.7 | 127.0 | 3.3 | 0.935 |
| C | 116.0 | 128.1 | 19 | 0.953 |
| B | 96.9 | 113.8 | 1.06 | 0.921 |
| B | 85.4 | 110.6 | 4.55 | 0.912 |

The peak melt temperature for each polymer sample was determined from the DSC measurements. A melt initiation temperature (i.e., the dry MIT) for each polymer was determined as the initial point of inflection of a DSC curve (preferably a first melt DSC curve) for the polymer, as illustrated in FIG. 3.

It is contemplated that in alternative embodiments, a dry MIT (or other dry MRT) for each polymer could be determined in other ways. An inflection point of a DSC curve (generated from measurements on a sample of a dry version of the polymer with no significant amount of diluent hydrocarbon present therewith) is a point of rapid onset of melting as indicated by the DSC curve, and thus the temperature at which the inflection point occurs can determine a dry melt initiation temperature.

An inflection point in a DSC melting curve (occurring at a temperature to be considered the melt initiation temperature) can be identified graphically from the DSC curve. For example, such an inflection point can be identified by locating the peak melt temperature indicated by the DSC curve (the temperature at which heat is absorbed most rapidly by the sample) and determining a line segment of a linear approximation of each of a sequence of different portions of the DSC curve (and the slope of each such line segment), where the end points of each such curve portion span the same predetermined range of temperatures but each curve portion is centered at a different temperature below the peak melt temperature. Then, for consecutive pairs of the line segments having decreasing center temperatures (i.e., for center temperatures that decrease from the peak melt temperature), identifying the difference between the slopes of each such pair, identifying the first pair of line segments (for two consecutive portions of the curve portions) for which the line segment slope difference is indicative of an inflection point of the DSC curve, and identifying (as the inflection point of the DSC curve) the temperature at which the line segments of this pair intersect. In the exemplary embodiments, the inflection point of the DSC curve for each polymer is considered to be the dry melt initiation temperature (dry MIT) value for the polymer.

The melt initiation temperatures listed in Table 1 are the dry melt initiation temperatures (MIT values) for the relevant polymers. The melt initiation temperatures listed in Table 1 were regressed to determine a "best fit" by least squares using the density and natural logarithm of the melt index (ln(MI)) for the relevant polymers. The regression line was:

$$MIT = 763.4\rho - 1.7524 \ln(MI) - 606.09 \quad (15)$$

where $\rho$ represents the density of the polymer (in units of g/cc, ASTM), and MI represents the melt index, $I_2$, of the polymer (in units of dg/min, ASTM).

In some embodiments, Equation 15 is used to determine the dry melt initiation temperature (MIT) for polymers other than those specifically listed in Table 1. In Equation 15, no term is employed to account for the specific catalyst type used to produce the polymer. This is appropriate since all combinations of polymer and catalyst type for which DSC measurements were performed were found to fit the correlation of Equation 15. However, it is anticipated that polymers produced by other catalyst systems (i.e. other than Catalysts A, B or C) may have MIT values that do not fit the regression curve defined by Equation 15.

The inventors have coded into an Excel spreadsheet the above-described melt initiation temperature depression model which uses Equations 4, 9, 10, and 11, for application to polymerization of polyethylene with typical condensable gas components (C4 olefins, C4 saturates, C6 olefins, C6 saturates and isopentane). Solubility parameters for these gases were obtained from the *Chemical Properties Handbook* ©1999, and are listed in Table 2 below. A value for the of solubility parameter of polyethylene was obtained from an average of several values that are listed for polyethylene in the *Polymer Handbook*, 4th ed.

TABLE 2

| Solubility Parameters | |
|---|---|
| | $((cal/cm^3)^{1/2})$ |
| 1-Butene | 6.717 |
| n-Butane | 7.062 |
| Isopentane | 6.771 |
| 1-Hexene | 7.352 |

TABLE 2-continued

| Solubility Parameters | |
|---|---|
| | $((cal/cm^3)^{1/2})$ |
| n-Hexane | 7.323 |
| Polyethylene | 7.95 |

Table 3 shows an exemplary calculation, performed using the coded melt initiation temperature depression model for a polymer of the type produced by Catalyst A, with a melt index (MI) of 1.0 dg/min (ASTM), and a density of 0.918 g/cc (ASTM), being produced in a fluid bed reactor. The calculation was based on assumed values of condensable diluent gas concentrations, temperature, and pressure (as provided in the table) that are believed to be representative of Catalyst A in commercial operation.

TABLE 3

| | |
|---|---|
| 1-Hexene partial pressure (bar) | 0.217 |
| Isopentane partial pressure (bar) | 3.45 |
| Reactor temperature, Trx (° C.) | 85 |
| Reactor pressure (bar) | 21.7 |
| Polymer peak melting temp., $T_m^0$ (° C.) | 115.86 |
| Melt point depression, D (° C.) | 13.00 |
| Reduced peak melting temp., $T_m$ (° C.) | 102.86 |
| Melt initiation temp., MIT (° C.) | 94.71 |
| Reduced MIT, $MIT_R$ (° C.) | 81.71 |
| $\Delta$MIT, at Trx = 85° C., (° C.) | 3.38 |

In the exemplary calculation, the dry melt initiation temperature (MIT) for the polymer was determined from the correlation of Equation 15. The melting point depression D was determined from Equations 4, 9, 10, and 11, (using the indicted values of temperature and diluent gas concentrations), and the resulting calculated value was 13° C. A value of reduced melt initiation temperature $MIT_R$ was determined as the difference MIT−D, which produced an estimated value of 81.71° C. Since this was lower than the reactor temperature (Trx) of 85° C., the calculation thus determined that (this example) system was operating with a positive value of $\Delta$MIT equal to 3.38° C. Since this was less than the limiting range of $\Delta$MIT values that apply for Catalyst A (5 to 6° C.), the reactor system would be expected to operate at the conditions above without excessive resin stickiness in the fluidized bed and, consequently, without an increased tendency for discontinuity events such as sheeting, chunking or distributor plate fouling caused by excessive stickiness.

Embodiments of the inventive method which use the above-described MIT depression model allow linkage of resin properties and reactor operating conditions to predict operating conditions under which discontinuity events due to resin stickiness can be avoided during start-ups as well as steady-state operation. These embodiments also allow reactor production rates to be safely maximized while minimizing the potential for discontinuity events, and allow production rates to be maximized (i.e., to proceed with maximum combinations of reactor temperature and ICA) while avoiding the conditions in the reactor (or combinations of conditions) that would lead to excessive stickiness and discontinuity events. These embodiments use only readily available process and resin property data, and can be readily implemented at plant sites either on-line through process control systems (i.e., by processing the relevant data in a processor that has been programmed to implement the inventive method and calculations or may be implemented off-line using available spreadsheets.

Several variations (or improvements) of the described examples of the inventive method are contemplated:

other solubility correlations for condensing and comonomers can be employed;

other methods to predict (possibly more accurately) mutual solubilities in multi-component systems can be employed;

improved enthalpy of fusion values ($\Delta Hu$) can be employed to account for variation of $\Delta Hu$ with polymer density. (It has been reported in the literature that $\Delta Hu$ is a function of the polymer density.); and dilatometry data can be used to predict (possibly more accurately) the polymer and diluent volume fractions.

The inventors have appreciated the importance of isomeric compounds (isomers of comonomers) present in fluid bed polymerization reactors, in monitoring and optionally also controlling polymerization reactions occurring in the reactors (e.g., polyethylene polymerization reactions under metallocene catalyst polymerization conditions). Such isomeric compounds are relatively inert and accumulate significantly in commercial reactors fitted with recovery systems. (Isomers of the comonomer are rarely observed in any substantial amount in pilot plants which do not operate with recovery systems.) Because these isomers can be present in substantial amounts in commercial reaction systems, they can have a substantial impact of the melting point depression D and the reduced melt reference temperature $MRT_R$. Preferred embodiments of the invention recognize and account for the impact of accumulated isomers on the melting point depression D, and the resulting values of $MRT_R$ and $\Delta MRT$. Procedures to remedy the effects of accumulated isomers (such as controlled venting of the reactor as described below) are preferably also implemented.

The inventors have considered gas chromatograph composition data for isomers in at least one commercial, gas phase, polyethylene polymerization reactor operating with a catalyst substantially equivalent to Catalyst A. The data was analyzed to characterize separately the 1-hexene comonomer and the C6 and C6+ isomers of the comonomer in samples of cycle gas from the reactor. The data indicated that isomer concentrations as high as 2.5 mole percent (of the total reactor gas) were obtained in the reactor system, which was substantially higher than the approximately 1 to 1.5 mole percent concentration of 1-hexene alone. Further, at these levels, the isomers themselves (excluding the comonomer) produced an increased depression of the MIT equal to 4° C., which represents a very significant impact on commercial operations, including the tendency for sheeting. The inventors expect that an isomer concentrations greater than 2.5 mole percent would have a correspondingly greater impact on estimated degree of MIT depression and thus on likelihood of sheeting, if isomer accumulation were allowed to continue until such concentrations were reached.

Whatever method is employed to determine a dry melt reference temperature and reduced melt reference temperature in accordance with the invention, a consistent method is recommended to be used throughout the calculations, and appropriate limits for $\Delta MRT$ or $\Delta MIT$ (limits that apply for the particular method of determining melt reference temperature that is employed) established, preferably through actual operating experience. In practice, limiting values of $\Delta MIT$ or $\Delta MRT$ are typically those values that correlate with an increased tendency for sheeting, chunking, and/or distributor plate fouling.

Specific methods and systems for inferring polymer stickiness by calculating the melting curve depression have been described herein. However, it is also contemplated that the melting curve depression D can be can be determined or estimated in any of a number of different ways; for example, in ways that do not make use of the Flory equation, or that use other correlations for the solubility of diluent gas components in the resin (i.e. other than those presented in the examples). The inventors contemplate that other such methods may be constructively employed. For example, a method including reasonable, engineering estimates of the diluent gas solubilities and the resulting depression of the polymer melting curve, may be employed.

In preferred embodiments of the invention, all condensable components that are present in significant amounts in the cycle gas stream (including comonomer isomers) are measured and the step of determining an estimated degree of depression of dry melt reference temperature (for a dry version of the resin being produced) accounts for such significant condensable components. The significant components should include isomer(s) of each comonomer present (e.g., each comonomer that is a $C_6$ isomer, or each comonomer that is a $C_3$-$C_{10}$ alpha olefin). It is expected that some embodiments of the invention will use a lumped isomer concentration value for determining an estimated degree of dry melt reference temperature depression that accounts for the contributions of all isomers present in significant concentrations.

Accurate accounting for isomers in determination of estimated degree of dry melt reference temperature (e.g., dry melt initiation temperature) depression is expected to provide direct benefits in many if not all embodiments of the invention, including those which generate a reference temperature based on bed-averaged parameters of steady-state reactions and use them to characterize and control the steady-state reactions, and those which generate a reference temperature based on instantaneous reaction parameters and use them to characterize and control the reactions during reaction transitions.

A specific control action to remedy the impact of isomers (of comonomers) on $\Delta MRT$ is to vent isomers from the reactor/recycle system. Vented isomers may go to flare or to a recovery system separate from the reactor/recycle system of the reactor. As is well known to those skilled in the art, direct venting of the cycle gas to flare is possible, but is likely to be far from optimal. A preferred point for extracting a vent is from the gas stream exiting the resin purging system. A gas vent from this location contains a relatively high concentration of isomers (up to 50 percent by weight), and a relatively low concentration of ethylene. Depending on specific designs, other reactor systems with other configurations of product discharge, purging and recovery systems may have different preferred vent points.

We next describe examples of commercial-scale reactions (e.g., commercial-scale, gas-phase fluidized-bed polymerization reactions) that can be monitored and optionally also controlled in accordance with the invention. Some such reactions can occur in a reactor having the geometry of reactor 10 of FIG. 1. In different embodiments of the invention, performance of any of a variety of different reactors is monitored and optionally also controlled in accordance with the invention.

In some embodiments, a continuous gas phase fluidized bed reactor is monitored and optionally also controlled in accordance with the invention while it operates to perform polymerization as follows: The fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is 1-hexene. The individual flow rates of ethylene, hydrogen and comonomer are controlled to maintain fixed gas composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio (or alternatively, the flow rates of comonomer and ethylene are held at a fixed ratio). The concentration of all gases is measured by an on-line gas chromatograph to ensure relatively constant composition in the recycle gas stream. A solid or liquid catalyst is injected directly into the fluidized bed using purified nitrogen as a carrier. The feed rate of catalyst is adjusted to maintain a constant production rate. The reacting bed of growing polymer particles is maintained in a fluidized state by the continuous flow of make up feed and recycle gas through the reaction zone (i.e. the fluidized bed). In some implementations, a superficial gas velocity of 1 to 3 ft/sec is used to achieve this, and the reactor may be operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is monitored and optionally also controlled in accordance with the invention while it operates to perform polymerization using any of a variety of different processes (e.g., slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction that is a continuous gas phase process (e.g., a fluid bed process) is monitored and optionally also controlled in accordance with the invention. A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode". A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is compressed in a compressor and passed through a heat exchanger wherein the heat of polymerization is removed, and then returned to the reaction zone.

The reactor temperature (Trx) of the fluid bed process is normally operated at the highest temperature that is feasible, given the stickiness or sintering characteristics of the polymer in the fluid bed. Although there is no generally recognized method for establishing the upper limit of reactor temperature, the upper limit is believed to be related to the sintering temperature of the polymer product. Typical embodiments of the inventive method provide a quantitative means for setting the temperature limits based on the $MRT_R$ (the reduced melt reference temperature, which is typically a temperature at which the onset of melting is expected to occur in the reactor). The upper limit of reactor temperature is preferably set by a limiting value of $\Delta MRT$, defined above, or a limiting value of another $\Delta MRT$ parameter. The limiting value of $\Delta MRT$, in preferred embodiments, is the maximum amount by which the reactor temperature can exceed the $MRT_R$ without inducing excessive stickiness in the product.

In other embodiments, a reactor whose operation is monitored and optionally also controlled in accordance with the invention effects polymerization by a slurry polymerization process. A slurry polymerization process generally uses pressures in the range of from 1 to 50 atmospheres, and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

In other embodiments, a reaction monitored and optionally also controlled in accordance with the invention is or includes particle form polymerization, or a slurry process in which the temperature is kept below the temperature at which the polymer goes into solution. In other embodiments, a reaction monitored and optionally also controlled in accordance with the invention is a loop reactor or one of a plurality of stirred reactors in series, parallel, or combinations thereof. Non-limiting examples of slurry processes include continuous loop or stirred tank processes.

A reaction monitored and optionally also controlled in accordance with some embodiments of the invention can produce homopolymers of olefins (e.g., homopolymers of ethylene), and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reaction monitored and optionally also controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range in the gas phase of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 100 atmospheres pressure in yet another embodiment, and up to 50 atmospheres in yet another embodiment, and up to 10 atmospheres in yet another embodiment.

Hydrogen gas is often used in olefin polymerization to control the final properties of the polyolefin. For some types of catalyst systems, it is known that increasing concentrations (or partial pressures) of hydrogen may alter the molecular weight or melt index (MI) of the polyolefin generated. The MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in some polymerization processes is an amount necessary to achieve the desired MI (or molecular weight) of the final polyolefin resin. In one embodiment, the mole ratio in the gas phase of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor monitored and optionally also controlled in accordance with some embodiments of the invention can be an element of a staged reactor employing two or more reactors in series, wherein one reactor may produce, for example, a high molecular weight component and another reactor may produce a low molecular weight component.

A reactor monitored and optionally also controlled in accordance with the invention can implement a slurry or gas phase process in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

A reactor monitored and optionally also controlled in accordance with the invention can employ one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution, a slurry, or as a solid (preferably as a powder) with or without the catalyst system or its components.

In a reactor monitored and optionally also controlled in accordance with some embodiments of the invention, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Kemamine AS-990 (ICI Specialties, Bloomington Del.). Other antistatic compositions include the Octastat family of compounds, more specifically Octastat 2000, 3000, and 5000.

Metal fatty acids and antistatic agents can be added as either solid slurries, solutions, or solids (preferably as powders) as separate feeds into the reactor. One advantage of this method of addition is that it permits on-line adjustment of the level of the additive.

Examples of polymers that can be produced in accordance with the invention include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more C2-C18 alpha olefin; terpolymers of one or more C2-C18 alpha olefins with a diene.

Monomers that can be present in a reactor monitored and optionally also controlled in accordance with the invention include one or more of: C2-C18 alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization can be monitored and optionally also controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process monitored and optionally also controlled in accordance with the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, Chromium based catalysts, Vanadium based catalysts (e.g., vanadium oxychloride and vanadium acetylacetonate), Metallocene catalysts and other single-site or single-site-like catalysts, Cationic forms of metal halides (e.g., aluminum trihalides), anionic initiators (e.g., butyl lithiums), Cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction monitored and optionally also controlled in accordance with the invention can employ other additives, such as (for example) inert particulate particles.

It should be understood that while some embodiments of the present invention are illustrated and described herein, the invention is not to be limited to the specific embodiments described and shown.

What is claimed is:

1. A method, including the steps of:
   (a) monitoring a polymerization reaction which produces a polymer resin in a fluid bed reactor, wherein a dry melt reference temperature is characteristic of melting behavior of a dry version of the polymer resin;
   (b) in response to data indicative of at least one monitored parameter of the reaction, generating, in on-line fashion, a reduced melt reference temperature characteristic of the melting behavior of the polymer resin as it exists in the reactor, wherein the reduced melt reference temperature is at least substantially equal to the difference between the dry melt reference temperature and a melt reference temperature depression value, "D," where D is a temperature by which the dry melt reference temperature is depressed by the presence of diluent with the resin in the reactor; and
   (c) controlling the reaction in response to the reduced melt reference temperature.

2. The method of claim 1, also including the step of determining a stickiness control parameter from the reduced melt reference temperature.

3. The method of claim 1, wherein step (c) includes the step of controlling the reaction in response to the stickiness control parameter.

4. The method of claim 1, wherein step (c) includes the step of maintaining a current temperature of the reactor in a predetermined relation with the reduced melt reference temperature.

5. The method of claim 1, wherein step (a) includes the step of monitoring at least one instantaneous parameter of the reaction, and step (b) includes the step of generating melt reference data in response to data indicative of at least one monitored instantaneous parameter of the reaction.

6. The method of claim 1, wherein step (a) includes the step of monitoring at least one bed-averaged parameter of the reaction, and step (b) includes the step of generating melt reference data in response to data indicative of at least one monitored bed-averaged parameter of the reaction.

7. The method of claim 1, wherein step (b) includes the steps of generating first melt reference data indicative of a first reduced melt reference temperature in response to data indicative of at least one monitored instantaneous parameter of the reaction, generating additional melt reference data indicative of a second reduced melt reference temperature in response to data indicative of at least one bed-averaged parameter of the reaction, and step (c) includes the step of controlling the reaction in response to both the first reduced melt reference temperature and the second reduced melt reference temperature.

8. The method of claim 7, wherein step (c) includes the steps of controlling the reaction in response to the second reduced melt reference temperature during a transition in the reaction, and controlling the reaction in response to the first reduced melt reference temperature when said reaction is not undergoing a transition.

9. The method of claim 7, wherein step (c) includes the step of controlling the reaction in an effort to maintain the first reduced melt reference temperature below a first predetermined limit and to maintain the second reduced melt reference temperature below a second predetermined limit.

10. The method of claim 7, wherein step (c) includes the step of controlling the reaction in an effort to maintain the first reduced melt reference temperature within a first predetermined range and to maintain the second reduced melt reference temperature within a second predetermined range.

11. The method of claim 1, wherein step (c) includes the step of maintaining bed temperature in the reactor in a predetermined relation with the reduced melt reference temperature.

12. The method of claim 1, wherein step (c) includes the step of maintaining bed temperature in the reactor in a predetermined relation with a temperature range related to the reduced melt reference temperature.

13. The method of claim 1, wherein step (a) includes the step of monitoring reactor temperature, at least one of density and melt index of the polymer resin, and concentration of at least one diluent present with the resin in the reactor, and step (b) includes the steps of:
   determining said dry melt initiation temperature in response to data indicative of at least one of density and melt index of the polymer resin; and
   determining said temperature depression D by processing data, including data indicative of reactor temperature, concentration of each said diluent present with the resin in the reactor, and said dry melt initiation temperature, in accordance with a predetermined model.

14. The method of claim 13, wherein the concentration of each said diluent monitored in step (a) includes at least one of a concentration of at least one induced condensing agent, a concentration of at least one comonomer, and a concentration of at least one isomer of the comonomer.

15. The method of claim 13, wherein the concentration of each said diluent monitored in step (a) includes a concentration of at least one induced condensing agent, at least one comonomer, and at least one isomer of the comonomer.

16. The method of claim 13, wherein the reaction polymerizes ethylene and said at least one comonomer in the presence of a catalyst selected from a group consisting of Ziegler-Natta, chromium, chromium oxide, $AlCl_3$, cobalt, iron, palladium, and metallocene catalyst.

17. The method of claim 16, wherein the polymer resin is polyethylene and each said comonomer is a $C_3$-$C_{10}$ alpha olefin.

18. The method of claim 17, wherein the polymer resin is a polyolefin.

19. The method of claim 18, wherein the polymer resin is polyethylene.

* * * * *